(12) United States Patent
Dosovitsky et al.

(10) Patent No.: US 10,243,791 B2
(45) Date of Patent: Mar. 26, 2019

(54) AUTOMATED ADJUSTMENT OF SUBSCRIBER POLICIES

(71) Applicant: A10 Networks, Inc., San Jose, CA (US)

(72) Inventors: Gennady Dosovitsky, Sunnyvale, CA (US); Kishore Inampudi, Cupertino, CA (US)

(73) Assignee: A10 Networks, Inc., San Jose, CA (US)

( * ) Notice: Subject to any disclaimer, the term of this patent is extended or adjusted under 35 U.S.C. 154(b) by 195 days.

(21) Appl. No.: 14/825,883

(22) Filed: Aug. 13, 2015

(65) Prior Publication Data

US 2017/0048107 A1    Feb. 16, 2017

(51) Int. Cl.
    *G06F 15/173*     (2006.01)
    *H04L 12/24*     (2006.01)
    *H04L 12/26*     (2006.01)

(52) U.S. Cl.
    CPC ...... *H04L 41/0816* (2013.01); *H04L 41/5025* (2013.01); *H04L 43/08* (2013.01); *H04L 43/16* (2013.01)

(58) Field of Classification Search
    CPC ..... H04L 41/0816; H04L 43/08; H04L 43/16; H04L 41/5025; H04L 12/24; H04L 12/26
    See application file for complete search history.

(56) References Cited

U.S. PATENT DOCUMENTS

| | | | |
|---|---|---|---|
| 5,218,602 A | 6/1993 | Grant et al. | |
| 5,774,660 A | 6/1998 | Brendel et al. | |
| 5,862,339 A | 1/1999 | Bonnaure et al. | |
| 5,875,185 A | 2/1999 | Wang et al. | |
| 5,935,207 A | 8/1999 | Logue et al. | |
| 5,958,053 A | 9/1999 | Denker | |
| 5,995,981 A | 11/1999 | Wikstrom | |
| 6,003,069 A | 12/1999 | Cavill | |
| 6,047,268 A | 4/2000 | Bartoli et al. | |

(Continued)

FOREIGN PATENT DOCUMENTS

| | | | |
|---|---|---|---|
| CN | 1372662 A | 10/2002 | |
| CN | 1449618 A | 10/2003 | |

(Continued)

OTHER PUBLICATIONS

"Enhanced Interior Gateway Routing Protocol", Cisco, Document ID 16406, Sep. 9, 2005 update, 43 pages.

(Continued)

*Primary Examiner* — Cheikh T Ndiaye
(74) *Attorney, Agent, or Firm* — Keith Kline; The Kline Law Firm PC

(57) ABSTRACT

Provided are methods and systems for adjusting of subscriber policies. A method for adjusting of subscriber policies may include applying traffic enforcement rules to a data traffic associated with a subscriber. The method can further include determining network conditions associated with the data traffic. The method can include modifying, based on the determination of the network conditions, attributes according to attribute adjustment rules to obtain modified attributes. The method can further include modifying the traffic enforcement rules based on the modified attributes to obtain modified traffic enforcement rules.

20 Claims, 13 Drawing Sheets

(56) References Cited

U.S. PATENT DOCUMENTS

| | | |
|---|---|---|
| 6,075,783 A | 6/2000 | Voit |
| 6,131,163 A | 10/2000 | Wiegel |
| 6,219,706 B1 | 4/2001 | Fan et al. |
| 6,259,705 B1 | 7/2001 | Takahashi et al. |
| 6,321,338 B1 | 11/2001 | Porras et al. |
| 6,374,300 B2 | 4/2002 | Masters |
| 6,456,617 B1 | 9/2002 | Oda et al. |
| 6,459,682 B1 | 10/2002 | Ellesson et al. |
| 6,483,600 B1 | 11/2002 | Schuster et al. |
| 6,535,516 B1 | 3/2003 | Leu et al. |
| 6,578,066 B1 | 6/2003 | Logan et al. |
| 6,587,866 B1 | 7/2003 | Modi et al. |
| 6,600,738 B1 | 7/2003 | Alperovich et al. |
| 6,658,114 B1 | 12/2003 | Farn et al. |
| 6,748,414 B1 | 6/2004 | Boumas |
| 6,772,205 B1 | 8/2004 | Lavian et al. |
| 6,772,334 B1 | 8/2004 | Glawitsch |
| 6,779,017 B1 | 8/2004 | Lamberton et al. |
| 6,779,033 B1 | 8/2004 | Watson et al. |
| 6,804,224 B1 | 10/2004 | Schuster et al. |
| 6,952,728 B1 | 10/2005 | Alles et al. |
| 7,010,605 B1 | 3/2006 | Dharmarajan |
| 7,013,482 B1 | 3/2006 | Krumel |
| 7,058,718 B2 | 6/2006 | Fontes et al. |
| 7,069,438 B2 | 6/2006 | Balabine et al. |
| 7,076,555 B1 | 7/2006 | Orman et al. |
| 7,143,087 B2 | 11/2006 | Fairweather |
| 7,167,927 B2 | 1/2007 | Philbrick et al. |
| 7,181,524 B1 | 2/2007 | Lele |
| 7,218,722 B1 | 5/2007 | Turner et al. |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,353 B2 | 5/2008 | Yang |
| 7,373,500 B2 | 5/2008 | Ramelson et al. |
| 7,391,725 B2 | 6/2008 | Huitema et al. |
| 7,398,317 B2 | 7/2008 | Chen et al. |
| 7,423,977 B1 | 9/2008 | Joshi |
| 7,430,755 B1 | 9/2008 | Hughes et al. |
| 7,463,648 B1 | 12/2008 | Eppstein et al. |
| 7,467,202 B2 | 12/2008 | Savchuk |
| 7,472,190 B2 | 12/2008 | Robinson |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 | 9/2009 | Wang et al. |
| 7,584,301 B1 | 9/2009 | Joshi |
| 7,590,736 B2 | 9/2009 | Hydrie et al. |
| 7,610,622 B2 | 10/2009 | Touitou et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,733,866 B2 | 6/2010 | Mishra et al. |
| 7,747,748 B2 | 6/2010 | Allen |
| 7,765,328 B2 | 7/2010 | Bryers et al. |
| 7,792,113 B1 | 9/2010 | Foschiano et al. |
| 7,808,994 B1 | 10/2010 | Vinokour et al. |
| 7,818,252 B2 * | 10/2010 | Jackowski ........... G06Q 20/102 705/35 |
| 7,826,487 B1 | 11/2010 | Mukerji et al. |
| 7,881,215 B1 | 2/2011 | Daigle et al. |
| 7,948,952 B2 | 5/2011 | Hurtta et al. |
| 7,965,727 B2 | 6/2011 | Sakata et al. |
| 7,970,934 B1 | 6/2011 | Patel |
| 7,979,694 B2 | 7/2011 | Touitou et al. |
| 7,983,258 B1 | 7/2011 | Ruben et al. |
| 7,990,847 B1 | 8/2011 | Leroy et al. |
| 7,991,859 B1 | 8/2011 | Miller et al. |
| 7,992,201 B2 | 8/2011 | Aldridge et al. |
| 8,019,870 B1 | 9/2011 | Eppstein et al. |
| 8,032,634 B1 | 10/2011 | Eppstein et al. |
| 8,081,640 B2 | 12/2011 | Ozawa et al. |
| 8,090,866 B1 | 1/2012 | Bashyam et al. |
| 8,099,492 B2 | 1/2012 | Dahlin et al. |
| 8,116,312 B2 | 2/2012 | Riddoch et al. |
| 8,122,116 B2 | 2/2012 | Matsunaga et al. |
| 8,151,019 B1 | 4/2012 | Le et al. |
| 8,179,809 B1 | 5/2012 | Eppstein et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,261,339 B2 | 9/2012 | Aldridge et al. |
| 8,266,235 B2 | 9/2012 | Jalan et al. |
| 8,296,434 B1 | 10/2012 | Miller et al. |
| 8,312,507 B2 | 11/2012 | Chen et al. |
| 8,379,515 B1 | 2/2013 | Mukerji |
| 8,499,093 B2 | 7/2013 | Grosser et al. |
| 8,539,075 B2 | 9/2013 | Bali et al. |
| 8,554,929 B1 | 10/2013 | Szeto et al. |
| 8,559,437 B2 | 10/2013 | Mishra et al. |
| 8,560,693 B1 | 10/2013 | Wang et al. |
| 8,584,199 B1 | 11/2013 | Chen et al. |
| 8,595,791 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,750,164 B2 | 6/2014 | Casado et al. |
| 8,782,221 B2 | 7/2014 | Han |
| 8,787,174 B2 * | 7/2014 | Riley ................. H04L 12/14 370/237 |
| 8,813,180 B1 | 8/2014 | Chen et al. |
| 8,826,372 B1 | 9/2014 | Chen et al. |
| 8,879,427 B2 | 11/2014 | Krumel |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 8,996,670 B2 * | 3/2015 | Kupinsky ........... H04L 41/0893 370/238 |
| 9,094,364 B2 | 7/2015 | Jalan et al. |
| 9,106,561 B2 | 8/2015 | Jalan et al. |
| 9,137,301 B1 | 9/2015 | Dunlap et al. |
| 9,154,577 B2 | 10/2015 | Jalan et al. |
| 9,154,584 B1 | 10/2015 | Han |
| 9,215,275 B2 | 12/2015 | Kannan et al. |
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,386,088 B2 | 7/2016 | Zheng et al. |
| 9,531,846 B2 | 12/2016 | Han et al. |
| 2001/0042200 A1 | 11/2001 | Lamberton et al. |
| 2001/0049741 A1 | 12/2001 | Skene et al. |
| 2002/0026515 A1 | 2/2002 | Michielsens et al. |
| 2002/0032777 A1 | 3/2002 | Kawata et al. |
| 2002/0032799 A1 | 3/2002 | Wiedeman et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0133491 A1 | 9/2002 | Sim et al. |
| 2002/0138618 A1 | 9/2002 | Szabo |
| 2002/0141386 A1 | 10/2002 | Minert et al. |

(56) References Cited

U.S. PATENT DOCUMENTS

| | | |
|---|---|---|
| 2002/0143991 A1 | 10/2002 | Chow et al. |
| 2002/0178259 A1 | 11/2002 | Doyle et al. |
| 2002/0188678 A1 | 12/2002 | Edecker et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0035409 A1 | 2/2003 | Wang et al. |
| 2003/0035420 A1 | 2/2003 | Niu |
| 2003/0061506 A1 | 3/2003 | Cooper et al. |
| 2003/0065762 A1 | 4/2003 | Stolorz et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0195962 A1 | 10/2003 | Kikuchi et al. |
| 2004/0010545 A1 | 1/2004 | Pandya |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0103315 A1 | 5/2004 | Cooper et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0250059 A1 | 12/2004 | Ramelson et al. |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0039033 A1 | 2/2005 | Meyers et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hafid et al. |
| 2005/0281190 A1 | 12/2005 | McGee et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0041745 A1 | 2/2006 | Parnes |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0164978 A1 | 7/2006 | Werner et al. |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0233101 A1* | 10/2006 | Luft .................. H04L 41/0896 370/229 |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0022479 A1 | 1/2007 | Sikdar et al. |
| 2007/0076653 A1 | 4/2007 | Park et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0124502 A1 | 5/2007 | Li |
| 2007/0156919 A1 | 7/2007 | Potti et al. |
| 2007/0165622 A1 | 7/2007 | O'Rourke et al. |
| 2007/0180119 A1 | 8/2007 | Khivesara et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0242738 A1 | 10/2007 | Park et al. |
| 2007/0243879 A1 | 10/2007 | Park et al. |
| 2007/0245090 A1 | 10/2007 | King et al. |
| 2007/0248009 A1 | 10/2007 | Petersen |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0016161 A1 | 1/2008 | Tsirtsis et al. |
| 2008/0031263 A1 | 2/2008 | Ervin et al. |
| 2008/0076432 A1 | 3/2008 | Senarath et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0120129 A1 | 5/2008 | Seubert et al. |
| 2008/0134332 A1 | 6/2008 | Keohane et al. |
| 2008/0162679 A1 | 7/2008 | Maher et al. |
| 2008/0225722 A1 | 9/2008 | Khemani et al. |
| 2008/0228781 A1 | 9/2008 | Chen et al. |
| 2008/0250099 A1 | 10/2008 | Shen et al. |
| 2008/0253390 A1 | 10/2008 | Das et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2008/0298303 A1 | 12/2008 | Tsirtsis |
| 2009/0024722 A1 | 1/2009 | Sethuraman et al. |
| 2009/0031415 A1 | 1/2009 | Aldridge et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0285196 A1 | 11/2009 | Lee et al. |
| 2009/0288134 A1* | 11/2009 | Foottit .................. G06F 21/105 726/1 |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0042869 A1 | 2/2010 | Szabo et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0095018 A1 | 4/2010 | Khemani et al. |

(56) References Cited

U.S. PATENT DOCUMENTS

| | | |
|---|---|---|
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0162378 A1 | 6/2010 | Jayawardena et al. |
| 2010/0205310 A1 | 8/2010 | Altshuler et al. |
| 2010/0210265 A1 | 8/2010 | Borzsei et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0235507 A1 | 9/2010 | Szeto et al. |
| 2010/0235522 A1 | 9/2010 | Chen et al. |
| 2010/0235880 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0083174 A1 | 4/2011 | Aldridge et al. |
| 2011/0093522 A1 | 4/2011 | Chen et al. |
| 2011/0099403 A1 | 4/2011 | Miyata et al. |
| 2011/0099623 A1 | 4/2011 | Garrard et al. |
| 2011/0110294 A1 | 5/2011 | Valluri et al. |
| 2011/0145324 A1 | 6/2011 | Reinart et al. |
| 2011/0149879 A1 | 6/2011 | Noriega et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshchandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0039175 A1* | 2/2012 | Sridhar ............... H04L 47/125 370/236 |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0106355 A1 | 5/2012 | Ludwig |
| 2012/0117382 A1 | 5/2012 | Larson et al. |
| 2012/0117571 A1 | 5/2012 | Davis et al. |
| 2012/0144014 A1 | 6/2012 | Natham et al. |
| 2012/0144015 A1 | 6/2012 | Jalan et al. |
| 2012/0151353 A1 | 6/2012 | Joanny |
| 2012/0170548 A1 | 7/2012 | Rajagopalan et al. |
| 2012/0173759 A1 | 7/2012 | Agarwal et al. |
| 2012/0179770 A1 | 7/2012 | Jalan et al. |
| 2012/0191839 A1 | 7/2012 | Maynard |
| 2012/0213072 A1* | 8/2012 | Kotecha ............ H04W 28/0268 370/235 |
| 2012/0215910 A1 | 8/2012 | Wada |
| 2012/0218892 A1* | 8/2012 | Kotecha ................ H04L 47/14 370/235 |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2012/0311116 A1 | 12/2012 | Jalan et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0124713 A1 | 5/2013 | Feinberg et al. |
| 2013/0135996 A1 | 5/2013 | Torres et al. |
| 2013/0136139 A1 | 5/2013 | Zheng et al. |
| 2013/0148500 A1 | 6/2013 | Sonoda et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0176908 A1* | 7/2013 | Baniel ................ H04L 12/1407 370/259 |
| 2013/0191486 A1 | 7/2013 | Someya et al. |
| 2013/0198385 A1 | 8/2013 | Han et al. |
| 2013/0250765 A1 | 9/2013 | Ehsan et al. |
| 2013/0258846 A1 | 10/2013 | Damola |
| 2013/0282791 A1 | 10/2013 | Kruglick |
| 2014/0012972 A1 | 1/2014 | Han |
| 2014/0086052 A1* | 3/2014 | Cai ...................... H04L 47/748 370/235 |
| 2014/0089500 A1 | 3/2014 | Sankar et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0219082 A1* | 8/2014 | Geijer Lundin ........ H04L 47/12 370/229 |
| 2014/0254367 A1* | 9/2014 | Jeong .................. H04L 47/803 370/233 |
| 2014/0258465 A1 | 9/2014 | Li |
| 2014/0258536 A1 | 9/2014 | Chiong |
| 2014/0269728 A1 | 9/2014 | Jalan et al. |
| 2014/0286313 A1 | 9/2014 | Fu et al. |
| 2014/0298091 A1 | 10/2014 | Carlen et al. |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0026794 A1 | 1/2015 | Zuk et al. |
| 2015/0039671 A1 | 2/2015 | Jalan et al. |
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0244566 A1 | 8/2015 | Puimedon |
| 2015/0281087 A1 | 10/2015 | Jalan et al. |
| 2015/0281104 A1 | 10/2015 | Golshan et al. |
| 2015/0296058 A1 | 10/2015 | Jalan et al. |
| 2015/0312092 A1 | 10/2015 | Golshan et al. |
| 2015/0312268 A1 | 10/2015 | Ray |
| 2015/0333988 A1 | 11/2015 | Jalan et al. |
| 2015/0350048 A1 | 12/2015 | Sampat et al. |
| 2015/0350379 A1 | 12/2015 | Jalan et al. |
| 2016/0014052 A1 | 1/2016 | Han |
| 2016/0014126 A1 | 1/2016 | Jalan et al. |
| 2016/0036778 A1 | 2/2016 | Chen et al. |
| 2016/0042014 A1 | 2/2016 | Jalan et al. |
| 2016/0043901 A1 | 2/2016 | Sankar et al. |
| 2016/0044095 A1 | 2/2016 | Sankar et al. |
| 2016/0050233 A1 | 2/2016 | Chen et al. |
| 2016/0088074 A1 | 3/2016 | Kannan et al. |
| 2016/0105395 A1 | 4/2016 | Chen et al. |
| 2016/0105446 A1 | 4/2016 | Chen et al. |
| 2016/0119382 A1 | 4/2016 | Chen et al. |
| 2016/0139910 A1 | 5/2016 | Ramanathan et al. |
| 2016/0156708 A1 | 6/2016 | Jalan et al. |
| 2016/0173579 A1 | 6/2016 | Jalan et al. |
| 2017/0048356 A1 | 2/2017 | Thompson et al. |

FOREIGN PATENT DOCUMENTS

| | | |
|---|---|---|
| CN | 1473300 A | 2/2004 |
| CN | 1529460 A | 9/2004 |
| CN | 1575582 A | 2/2005 |
| CN | 1714545 A | 12/2005 |
| CN | 1725702 A | 1/2006 |

(56) References Cited

FOREIGN PATENT DOCUMENTS

| | | |
|---|---|---|
| CN | 1910869 A | 2/2007 |
| CN | 101004740 A | 7/2007 |
| CN | 101094225 A | 12/2007 |
| CN | 101163336 A | 4/2008 |
| CN | 101169785 A | 4/2008 |
| CN | 101189598 A | 5/2008 |
| CN | 101193089 A | 6/2008 |
| CN | 101247349 A | 8/2008 |
| CN | 101261644 A | 9/2008 |
| CN | 101442425 A | 5/2009 |
| CN | 101495993 A | 7/2009 |
| CN | 101682532 A | 3/2010 |
| CN | 101878663 A | 11/2010 |
| CN | 102123156 A | 7/2011 |
| CN | 102143075 A | 8/2011 |
| CN | 102546590 A | 7/2012 |
| CN | 102571742 A | 7/2012 |
| CN | 102577252 A | 7/2012 |
| CN | 102918801 A | 2/2013 |
| CN | 103533018 A | 1/2014 |
| CN | 103944954 A | 7/2014 |
| CN | 104040990 A | 9/2014 |
| CN | 104067569 A | 9/2014 |
| CN | 104106241 A | 10/2014 |
| CN | 104137491 A | 11/2014 |
| CN | 104796396 A | 7/2015 |
| CN | 102577252 B | 3/2016 |
| CN | 102918801 B | 5/2016 |
| CN | 102571742 B | 7/2016 |
| EP | 1209876 A2 | 5/2002 |
| EP | 1770915 A1 | 4/2007 |
| EP | 1885096 A1 | 2/2008 |
| EP | 02296313 | 3/2011 |
| EP | 2577910 A2 | 4/2013 |
| EP | 2622795 A2 | 8/2013 |
| EP | 2647174 A2 | 10/2013 |
| EP | 2760170 A1 | 7/2014 |
| EP | 2772026 A1 | 9/2014 |
| EP | 2901308 A2 | 8/2015 |
| EP | 2760170 B1 | 12/2015 |
| HK | 1182560 | 11/2013 |
| HK | 1183569 | 12/2013 |
| HK | 1183996 | 1/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| HK | 1200617 A | 8/2015 |
| IN | 39/2015 | 9/2015 |
| IN | 261CHE2014 A | 7/2016 |
| IN | 1668CHENP2015 A | 7/2016 |
| JP | H09-097233 | 4/1997 |
| JP | 1999096128 | 4/1999 |
| JP | H11-338836 | 10/1999 |
| JP | 2000276432 A | 10/2000 |
| JP | 2000307634 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |
| JP | 2009500731 A | 1/2009 |
| JP | 2013528330 A | 7/2013 |
| JP | 2014504484 A | 2/2014 |
| JP | 2014143686 A | 8/2014 |
| JP | 2015507380 A | 3/2015 |
| JP | 5855663 B2 | 12/2015 |
| JP | 5906263 B2 | 4/2016 |
| JP | 5913609 B2 | 4/2016 |
| JP | 5946189 B2 | 6/2016 |
| KR | 100830413 B1 | 5/2008 |
| KR | 20130096624 A | 8/2013 |
| KR | 101576585 B1 | 12/2015 |
| KR | 101632187 B1 | 6/2016 |
| TW | 269763 B | 2/1996 |
| TW | 425821 B | 3/2001 |
| TW | 444478 B | 7/2001 |
| WO | WO2001013228 | 2/2001 |
| WO | WO2001014990 | 3/2001 |
| WO | WO2001045349 | 6/2001 |
| WO | WO2003103237 | 12/2003 |
| WO | WO2004084085 A1 | 9/2004 |
| WO | WO2006098033 A1 | 9/2006 |
| WO | WO2008053954 A1 | 5/2008 |
| WO | WO2008078593 A1 | 7/2008 |
| WO | WO2011049770 A2 | 4/2011 |
| WO | WO2011079381 A1 | 7/2011 |
| WO | WO2011149796 A2 | 12/2011 |
| WO | WO2012050747 A2 | 4/2012 |
| WO | WO2012075237 A2 | 6/2012 |
| WO | WO2012083264 A2 | 6/2012 |
| WO | WO2012097015 A2 | 7/2012 |
| WO | WO2013070391 A1 | 5/2013 |
| WO | WO2013081952 A1 | 6/2013 |
| WO | WO2013096019 A1 | 6/2013 |
| WO | WO2013112492 A1 | 8/2013 |
| WO | WO2014031046 A1 | 2/2014 |
| WO | WO2014052099 A2 | 4/2014 |
| WO | WO2014088741 A1 | 6/2014 |
| WO | WO2014093829 A1 | 6/2014 |
| WO | WO2014138483 A1 | 9/2014 |
| WO | WO2014144837 A1 | 9/2014 |
| WO | WO2014179753 A2 | 11/2014 |
| WO | WO2015153020 A1 | 10/2015 |
| WO | WO2015164026 A1 | 10/2015 |

OTHER PUBLICATIONS

Crotti, Manuel et al., "Detecting HTTP Tunnels with Statistical Mechanisms", IEEE International Conference on Communications, Jun. 24-28, 2007, pp. 6162-6168.

Haruyama, Takahiro et al., "Dial-to-Connect VPN System for Remote DLNA Communication", IEEE Consumer Communications and Networking Conference, CCNC 2008. 5th IEEE, Jan. 10-12, 2008, pp. 1224-1225.

Chen, Jianhua et al., "SSL/TLS-based Secure Tunnel Gateway System Design and Implementation", IEEE International Workshop on Anti-counterfeiting, Security, Identification, Apr. 16-18, 2007, pp. 258-261.

"EIGRP MPLS VPN PE-CE Site of Origin (SoO)", Cisco Systems, Feb. 28, 2006, 14 pages.

Koike et al., "Transport Middleware for Network-Based Control," IEICE Technical Report, Jun. 22, 2000, vol. 100, No. 53, pp. 13-18.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

Gite, Vivek, "Linux Tune Network Stack (Buffers Size) To Increase Networking Performance," accessed Apr. 13, 2016 at URL: <<http://www.cyberciti.biz/faq/linux-tcp-tuning/>>, Jul. 8, 2009, 24 pages.

"Tcp-TCP Protocol", Linux Programmer's Manual, accessed Apr. 13, 2016 at URL: <<https://www.freebsd.org/cgi/man.cgi?query=tcp&apropos=0&sektion=7&manpath=SuSE+Linux%2Fi386+11.0&format=asci>>, Nov. 25, 2007, 11 pages.

Cardellini et al., "Dynamic Load Balancing on Web-server Systems", IEEE Internet Computing, vol. 3, No. 3, pp. 28-39, May-Jun. 1999.

Spatscheck et al., "Optimizing TCP Forwarder Performance", IEEE/ACM Transactions on Networking, vol. 8, No. 2, Apr. 2000.

Kjaer et al. "Resource allocation and disturbance rejection in web servers using SLAs and virtualized servers", IEEE Transactions on Network and Service Management, IEEE, US, vol. 6, No. 4, Dec. 1, 2009.

(56) References Cited

OTHER PUBLICATIONS

Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.

Goldszmidt et al. NetDispatcher: A TCP Connection Router, IBM Research Report RC 20853, May 19, 1997.

* cited by examiner

AUTOMATED ADJUSTMENT OF SUBSCRIBER POLICIES

TECHNICAL FIELD

This disclosure relates generally to data processing and, more specifically, to automated adjusting of subscriber policies for a data traffic flow.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Certain network parameters may be monitored for predefined events and conditions. Such monitoring may involve a human operator. Upon detecting the predefined network events and conditions (for example, a threshold throughput of the network), the network operator may decide that certain changes or adjustments need to be applied to network policies to mitigate the predefined network events and conditions.

Monitoring the network can be a complex task with a great number of parameters that require monitoring, such as, for example, global factors (time of the day, show and sport events, planned and unplanned reconfiguration), a network status (resource availability and resource utilization), subscriber group behavior, subscriber individual behavior, dynamics of subscriber behavior, and so forth. Moreover, the more complex (in view of the number of parameters to be monitored) the network is, the faster the network operator needs to react to avoid network congestions and bad user experiences and to react to rapidly changing user or group behavior.

Additionally, manual intervention by the network operator into the network operational process may be a limiting factor in view of a low-speed reaction of the network operator and in view of a human factor in a semi-automated procedure of monitoring. Furthermore, policies that outline rules for the network operational process may be complex and granular, and mitigation of the network events or conditions may require only small changes in the policies to have a significant impact on network behavior. It can be very challenging for the network operator to monitor the network and to apply changes of any magnitude to granular policies.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for adjusting subscriber policies. Specifically, a method for adjusting subscriber policies may include applying traffic enforcement rules to a data traffic associated with a subscriber. The method can further include determining network conditions associated with the data traffic. The method can include modifying, based on the determination of the network conditions, attributes according to attribute adjustment rules to obtain modified attributes. The method can further include modifying the traffic enforcement rules based on the modified attributes to obtain modified traffic enforcement rules.

According to another approach of the present disclosure, there is provided a system for automated adjusting of subscriber policies. The system may comprise a servicing node and a policy management unit. The servicing node can be operable to apply traffic enforcement rules to a data traffic associated with a subscriber. Furthermore, the servicing node can be operable to determine network conditions associated with the data traffic. The servicing node can be operable to modify the traffic enforcement rules based on modified attributes to obtain modified traffic enforcement rules. The policy management unit can be operable to modify attributes based on attribute adjustment rules to obtain the modified attributes. The modifying of the attributes may be performed based on the determination of the network conditions.

According to another approach of the present disclosure, there is provided a system for automated adjustment of subscriber policies. The system may comprise a servicing node that can be operable to apply traffic enforcement rules to a data traffic associated with a subscriber. The servicing node can be further operable to determine network conditions associated with the data traffic. Based on the determination, the servicing node can be operable to modify attributes according to attribute adjustment rules to obtain modified attributes. The servicing node can be further operable to modify the traffic enforcement rules based on the modified attributes to obtain modified traffic enforcement rules.

In further example embodiments of the present disclosure, the method steps are stored on a machine-readable medium comprising instructions which, when implemented by one or more processors, perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
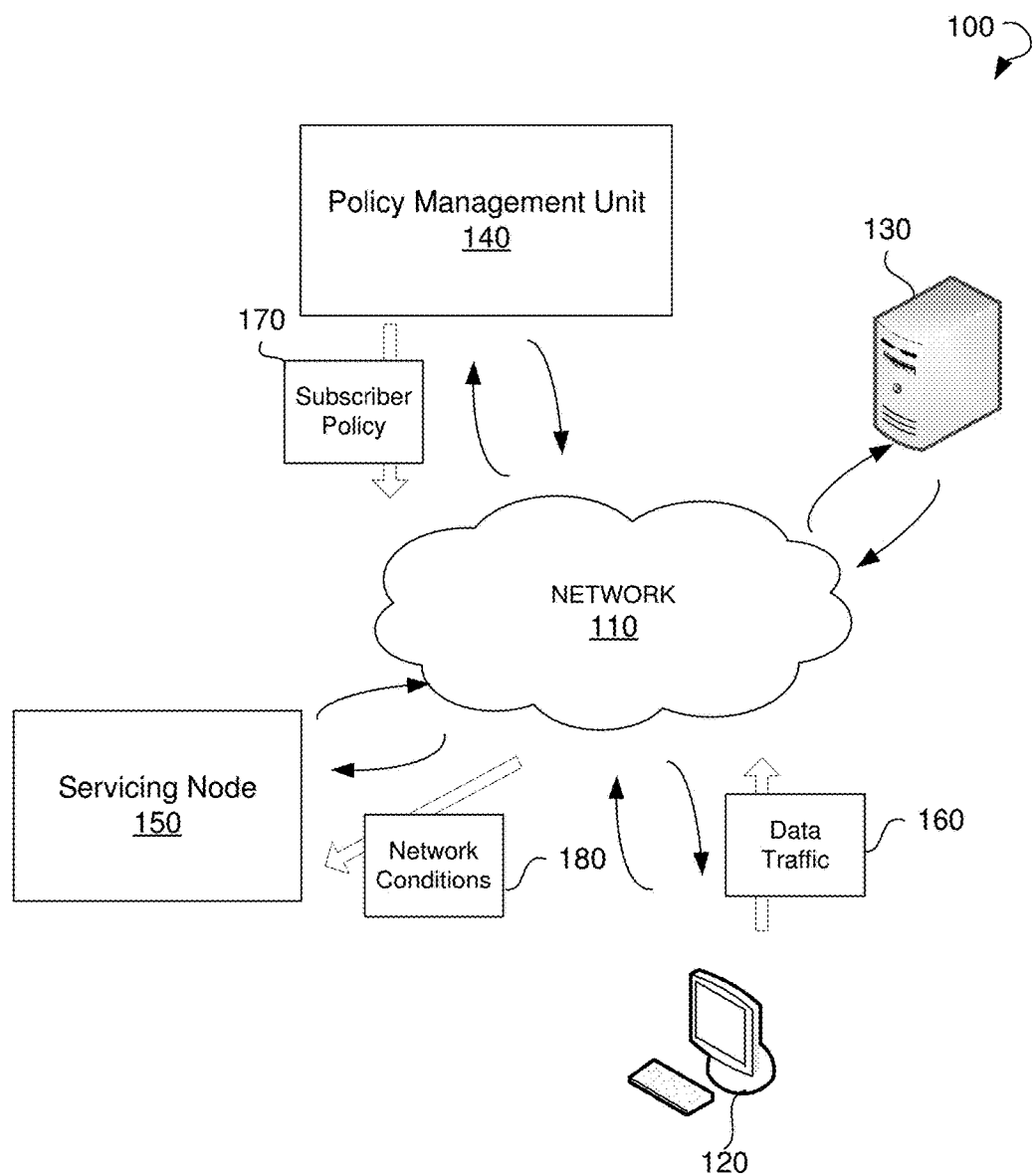
FIG. 1 shows an environment within which methods and systems for an automated adjustment of subscriber policies can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), a game console, a handheld gaming device, a cellular phone, a smart phone, a smart television system, and so forth.

The present disclosure relates to methods and systems for automated adjustment of subscriber policies of a network operational process. An example system of the present disclosure may include a policy management unit that may develop and maintain traffic enforcement rules, also referred herein to as policies. The traffic enforcement rules may include rules for processing of data traffic during operation of the network. Network conditions may change and the system may need to react to the changed network conditions to provide an efficient operation of the network. The network conditions may be determined based on attributes (also referred to herein as parameters) of the network, such as a network status, network throughput, resource unitization, bandwidth consumed by active users, and so forth.

The policy management unit may create attribute adjustment rules. The attribute adjustment rules may include rules that are to be applied in response to detection of predetermined attributes (for example, the attributes that are outside threshold values). Making decisions related to a policy modification and, more specifically, a modification of the traffic enforcement rules, may be delegated to a servicing node. Thus, the servicing node, also referred to herein as an enforcing element, can obtain traffic enforcement rules and attribute adjustment rules from a policy management unit. The servicing node may further apply the traffic enforcement rules to the data traffic. Upon applying the traffic enforcement rules, the servicing node can monitor network conditions. Based on the monitoring, the servicing mode may determine that certain attributes of the network need to be modified. For example, a predefined bandwidth limit may be not sufficient to ensure access to a server for active users and, therefore, the predefined bandwidth limit may need to be adjusted. Thus, the servicing node may apply the attribute adjustment rules to the attributes and obtain modified attributes. For example, the bandwidth limit may be increased to allow access to the server for active users. The modified attributes may allow for a normal operation of the network.

Furthermore, the servicing node may modify the traffic enforcement rules based on the modified attributes. Therefore, after modification of the attributes, the modified traffic enforcement rules may be applied to the data traffic of the network. Additionally, the servicing node may notify the policy management unit about modification of the traffic enforcement rules.

Referring now to the drawings, FIG. 1 illustrates an environment 100 within which methods and systems for automated adjustment of subscriber policies can be implemented. The environment 100 may include a network 110, a subscriber 120, a server 130, a policy management unit 140, and a servicing node 150. The subscriber 120 may include a network machine, a network resource, or a user that sends requests shown as data traffic 160 to the server 130. The server 130 may be associated with a plurality of services, applications, and websites accessible over the network 110. The subscriber 120 and the server 130 may communicate with each other using the network 110.

The network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The network 110 may include a network of data processing nodes that are interconnected for the purpose of data communication.

The policy management unit 140 may be responsible for creating and maintaining a subscriber policy 170. The servicing node 150 may be operable to process the data traffic 160 according to the subscriber policy 170. Furthermore, the servicing node 150 may monitor network conditions 180 established in the network upon applying of the subscriber policy 170. Based on the network conditions 180, the servicing node 150 may decide if the subscriber policy 170 needs to be modified. The servicing node 150 may modify the subscriber policy 170 and send a notification concerning modifications to the policy management unit 140.

Figure 2:
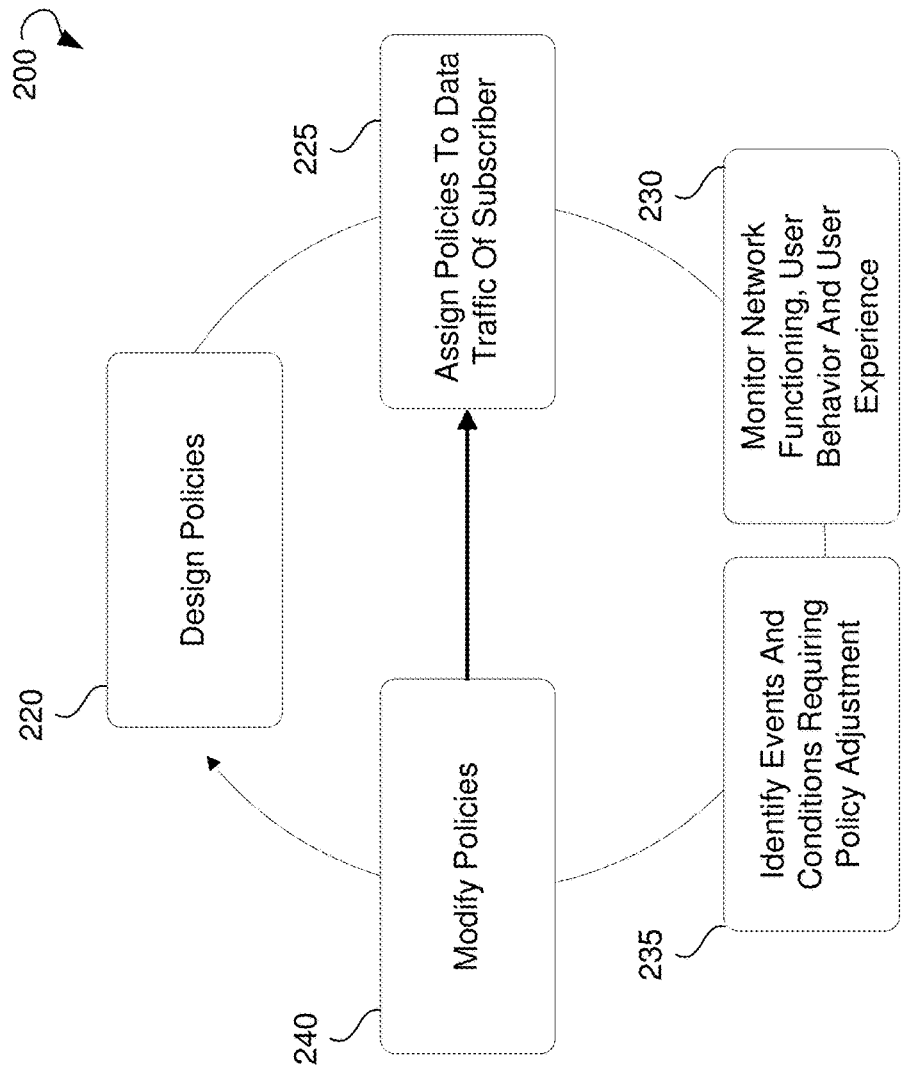
FIG. 2 is a diagram showing an operational process of reacting to changes in network conditions.
Figure 2:
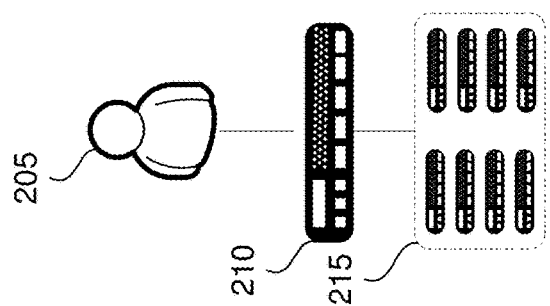

FIG. 2 is a diagram 200 showing a conventional operational process of reacting to changes in network conditions. More specifically, a network operator 205 can have access to a policy server 210 that may communicate with a plurality of policy engines 215. The operations performed by the network operator 205 may include designing policies at step 220. In an example embodiment, the policies may be selected by the network operator 205 from predetermined policies stored or developed by the policy engines 215. At step 225, the policies may be assigned to data traffic received from a subscriber so that the data traffic may be processed according to the assigned policies. Upon assigning the policies, the network operator 205 may monitor network functioning, a user behavior, a user experience, and other network conditions at step 230. During the monitoring, the network operator 205 may identify network conditions and events that require policy adjustment at step 235. More specifically, as the network conditions change, the policies applied to the data traffic may be inefficient for providing needed network performance. Therefore, such policies may require adjustment. At step 240, the network operator 205 may modify the policies with regard to the data traffic of the subscriber.

Figure 3:
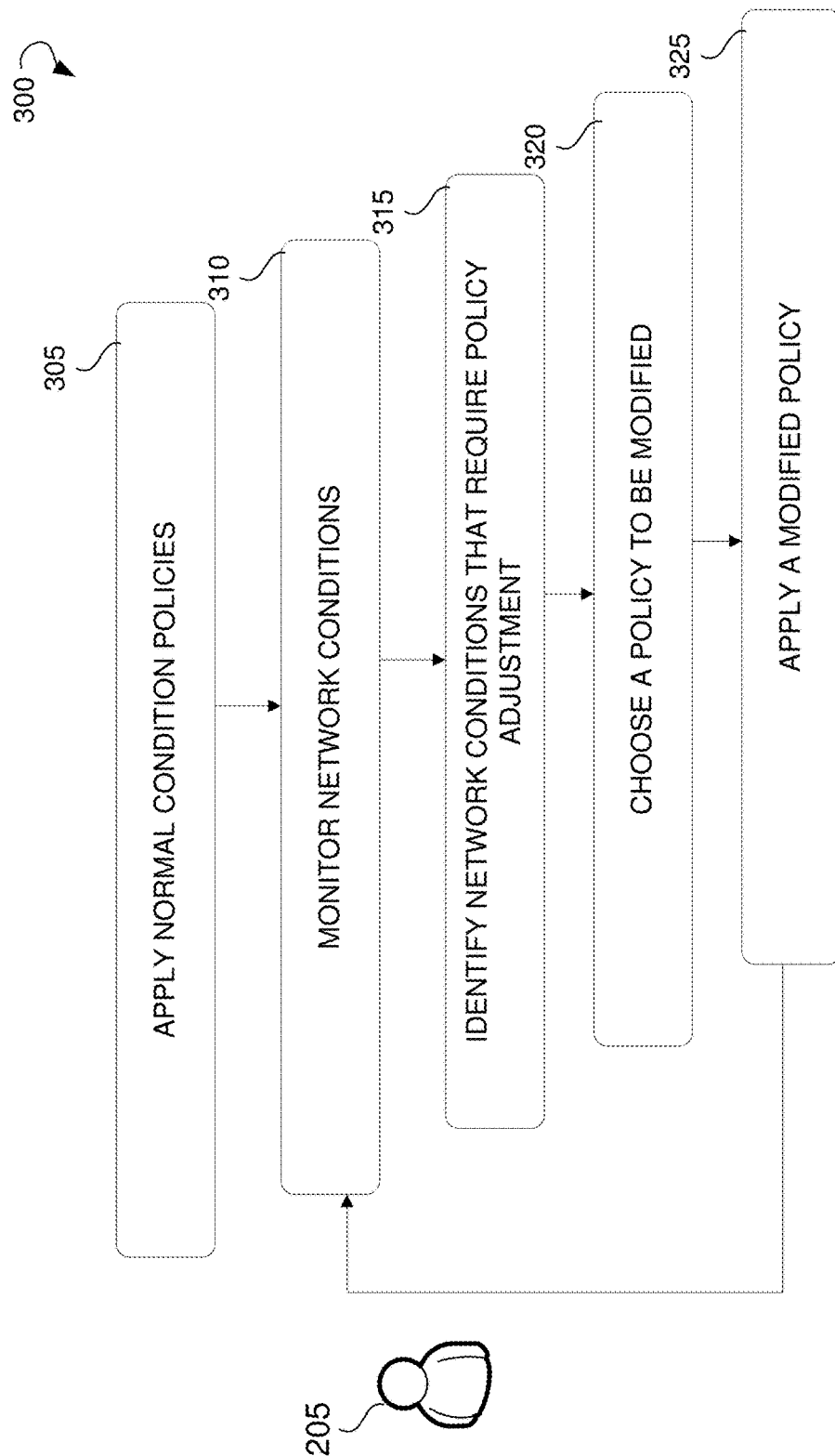
FIG. 3 is a flow chart diagram of a process for a policy adjustment for data traffic flow.

The conventional operational process of FIG. 2 is further explained in FIG. 3, which shows a flow chart diagram 300 of conventional adjustment of policies for data traffic flow. More specifically, the network operator 205 may apply normal condition policies to data traffic received from a subscriber or a group of subscribers at operation 305. The normal condition policies may be taken from policy engines. Upon applying the normal condition policies, the network operator 205 may monitor network conditions at operation 310. At operation 315, the network operator 205 may identify that certain network conditions may go beyond predetermined thresholds. For example, a network throughput may exceed a predetermined value (e.g., 70%). Based on such identifying, the operator may take a decision that policies need to be modified to maintain the identified network conditions and not exceed the predetermined thresholds. At operation 320, the network operator 205 may choose a policy to be modified. The network operator may further apply the modified policy to the data traffic at operation 325. After operation 325, the process may return to operation 310 so that the network operator 205 can continue monitoring the network conditions.

However, in view of a plurality of network conditions that require monitoring, the network operator 205 may be overloaded with the tasks of modifying the policies and, therefore, may be unable to react timely to the changing network conditions. Therefore, the network performance may be insufficient to provide the subscriber with access to network services and applications to which the subscriber sends the data traffic.

Figure 4:
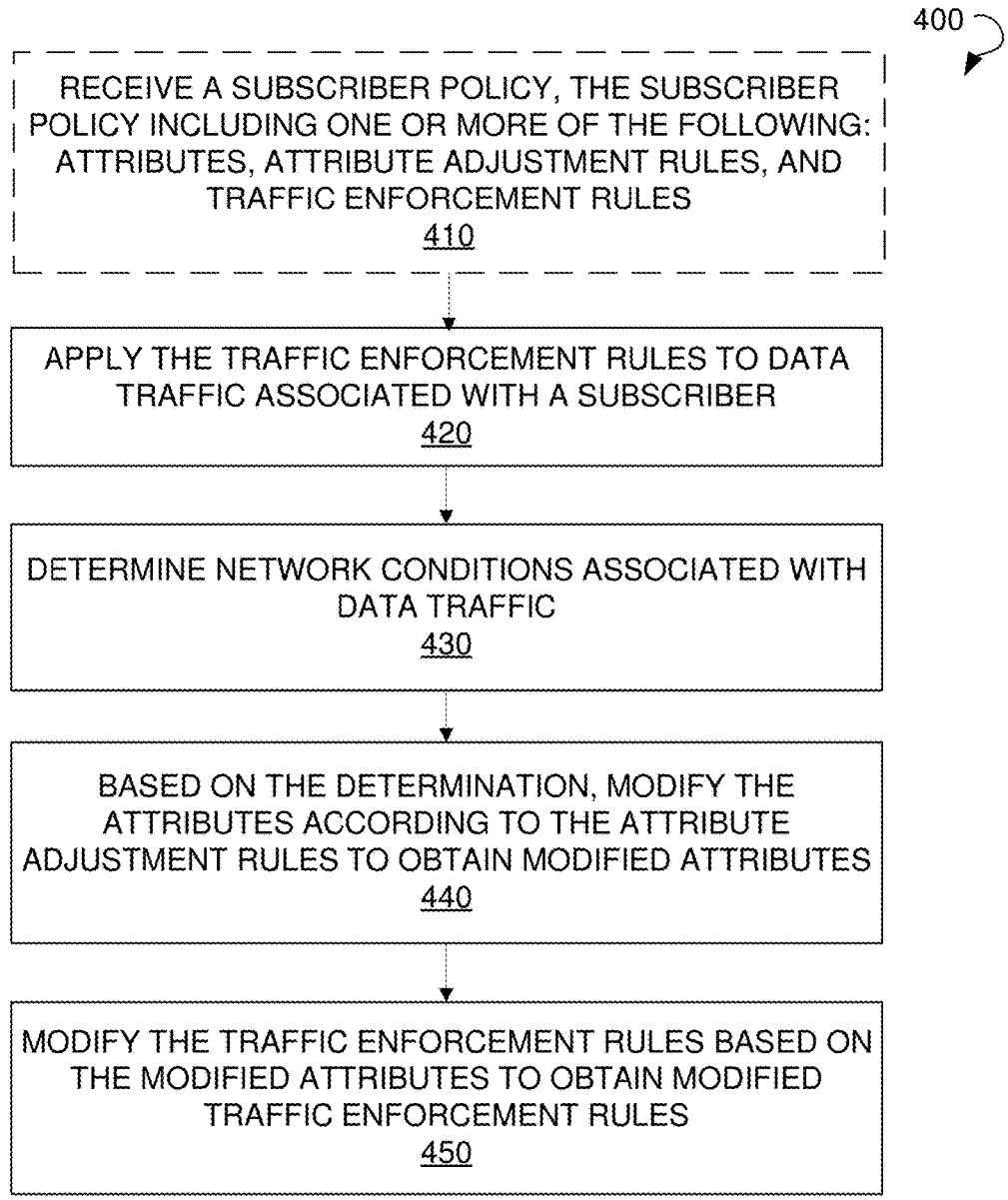
FIG. 4 shows a process flow diagram of a method for an automated adjustment of subscriber policies.

FIG. 4 shows a process flow diagram of a method 400 for automated adjusting of subscriber policies, according to an example embodiment. In some embodiments, the operations may be combined, performed in parallel, or performed in a different order. The method 400 may also include additional or fewer operations than those illustrated. The method 400 may be performed by processing logic that may comprise hardware (e.g., decision making logic, dedicated logic, programmable logic, and microcode), software (such as software run on a general-purpose computer system or a dedicated machine), or a combination of both.

The method 400 may commence with optional operation 410 of receiving a subscriber policy. In an example embodiment, the subscriber policy includes one or more of the following: attributes, attribute adjustment rules, and traffic enforcement rules. The method 400 may further include applying the traffic enforcement rules to a data traffic associated with a subscriber at operation 420.

The method 400 may continue with operation 430, at which network conditions associated with the data traffic may be determined. In an example embodiment, the network conditions may include one or more of the following: events associated with the network, a network workload, a resource availability, a resource utilization, a subscriber behavior, a user experience, a time, a planned reconfiguration, an unplanned reconfiguration, and so forth.

In some embodiments, the method 400 may optionally include continuous monitoring of the network conditions within the network. The monitoring conditions may be analyzed. Based on the analysis, an occurrence of a critical event may be determined. In an example embodiment, the critical event may include one or more of the following: an absence of one of a predetermined network condition, presence of an additional network condition being absent from the predetermined network conditions, exceeding a predetermined threshold of the one of the predetermined network conditions, and so forth. In response to the occurrence of the critical event, the attributes may be modified.

More specifically, upon determination of the network conditions, the modifying of the attributes may be performed based on attribute adjustment rules at operation 440. Based on the modification, modified attributes may be obtained.

The method 400 may continue with modifying the traffic enforcement rules at operation 450. The traffic enforcement rules may be modified based on the modified attributes. Therefore, modified traffic enforcement rules may be obtained based on the modification of the traffic enforcement rules. The modified traffic enforcement rules may be applied to a further data traffic associated with the subscriber.

Figure 5:
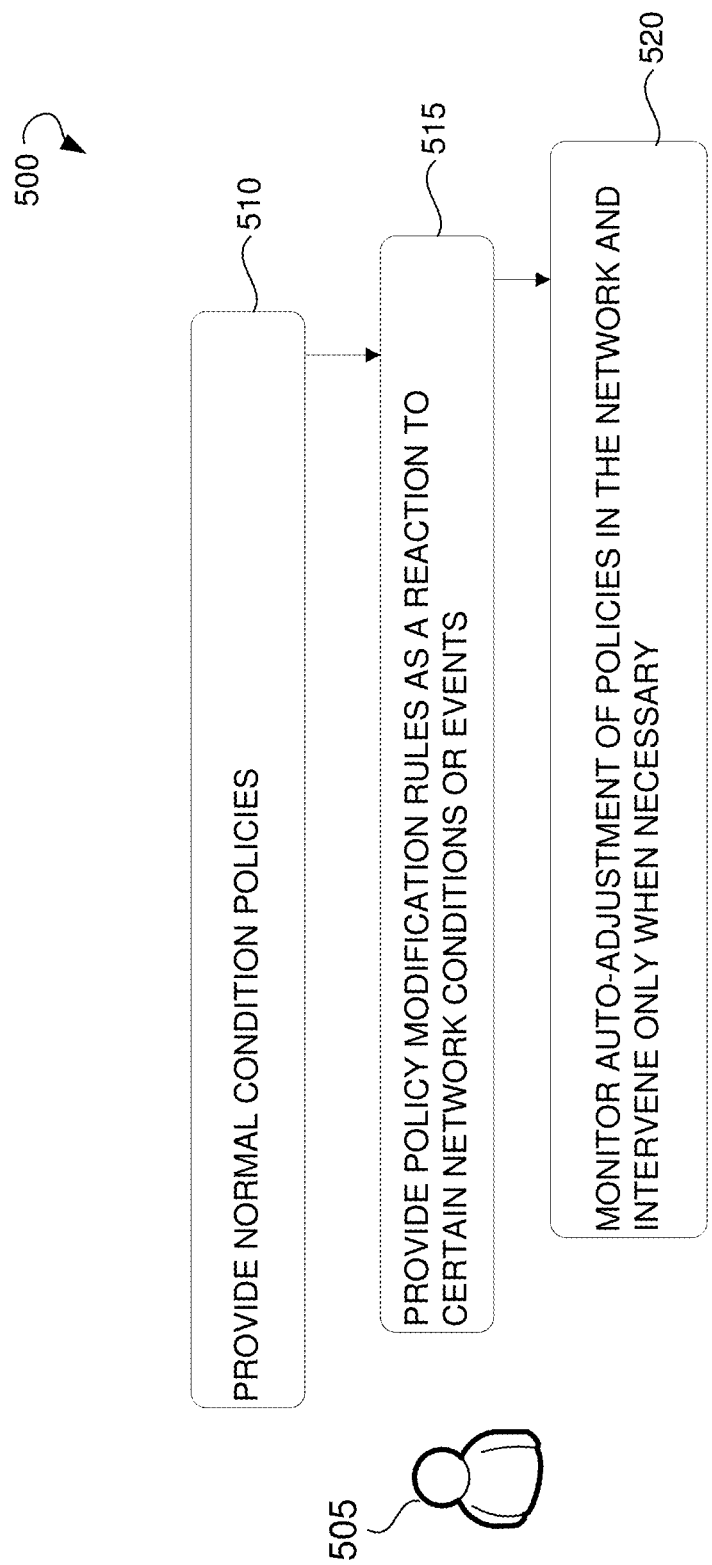
FIG. 5 is a flow chart diagram illustrating a process for policy adjustment by a network operator.

FIG. 5 is a flow chart diagram 500 illustrating a process performed by a network operator for automated adjusting of subscriber policies, according to an example embodiment. More specifically, a network operator 505 may provide normal condition policies at step 510. At step 515, the network operator 505 may provide policy modification rules, which may serve as rules for reacting to certain network conditions or events. At step 520, the network operator 505 may monitor automatic adjustment of policies based on the policy modification rules. The network operator 505 may intervene into the operational process only when necessary, such as for solving complex tasks, performing periodical checking of the network performance, or for other purposes. Therefore, the network operator 505 is not excluded from management of the network operational process, but a real-time reaction of the operator in response to a change of network conditions is not needed.

Figure 6:
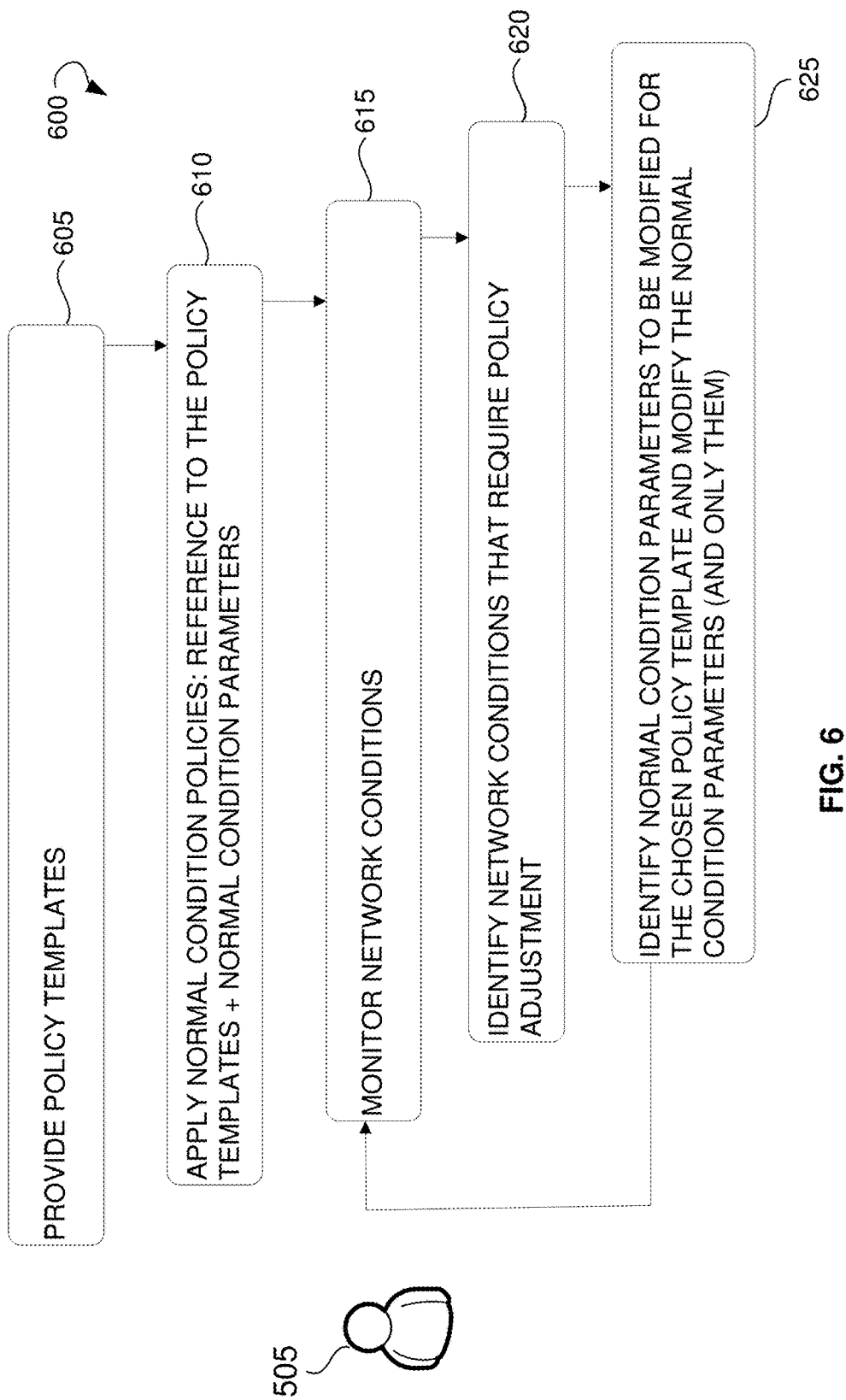
FIG. 6 is a flow chart diagram illustrating a process for adjustment of policies for data traffic flow using template-based policies.

FIG. 6 is a flow chart diagram 600 illustrating a process for adjustment of policies for data traffic flow using template-based policies, according to an example embodiment. More specifically, the network operator 505 may provide policy templates (i.e., templates of policies for a static configuration of the network) at step 605. At step 610, the network operator 505 may apply normal condition policies by using the policy templates and normal condition parameters of the network. At step 615, the network operator 505 may monitor network conditions.

At step 620, the network operator 505 may identify that certain network conditions may go beyond predetermined thresholds. For example, a network throughput may exceed a predetermined value (e.g., 70%). Based on such identifying, the network operator 505 may take a decision that policies need to be modified to maintain the identified network conditions so as to not exceed the predetermined thresholds. Based on such decision, the network operator 505 may identify normal condition parameters that need to be modified for the chosen policy template at step 625. Thereafter, the identified normal condition parameters may be modified. After step 625, the process may return to step 615 so that the network operator 505 can continue monitoring the network conditions.

Figure 7:
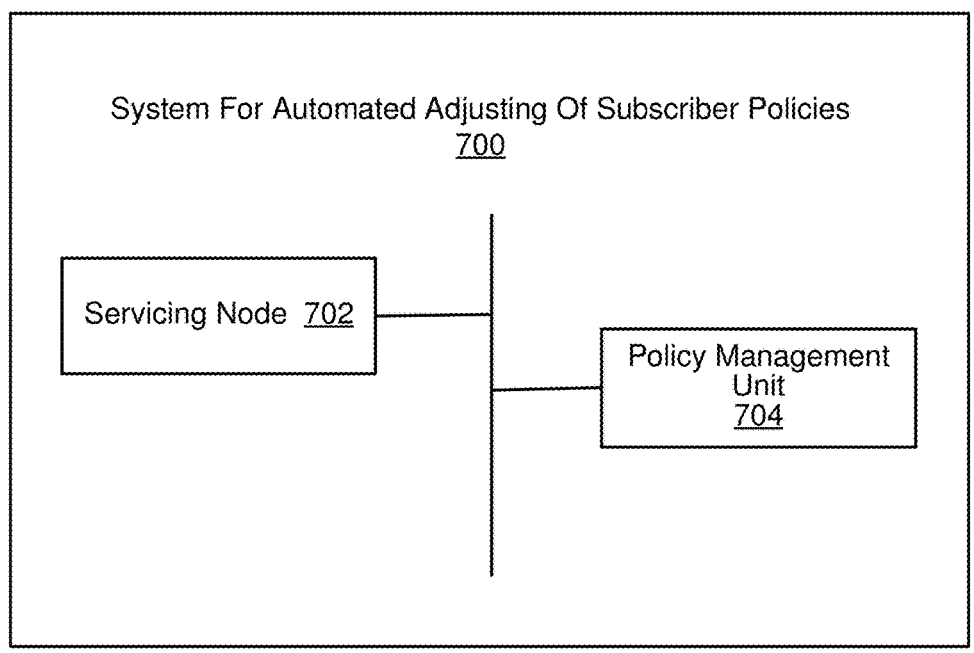
FIG. 7 shows a block diagram illustrating various modules of a system for automated adjustment of subscriber policies.

FIG. 7 shows a block diagram illustrating various modules of an example system 700 for automated adjusting of subscriber policies. Specifically, the system 700 may include a servicing node 702 and a policy management unit 704. Interactions between the servicing node 702 and the policy management unit 704 of the system 700 are explained in detail with reference to FIG. 8 and FIG. 9.

Figure 8:
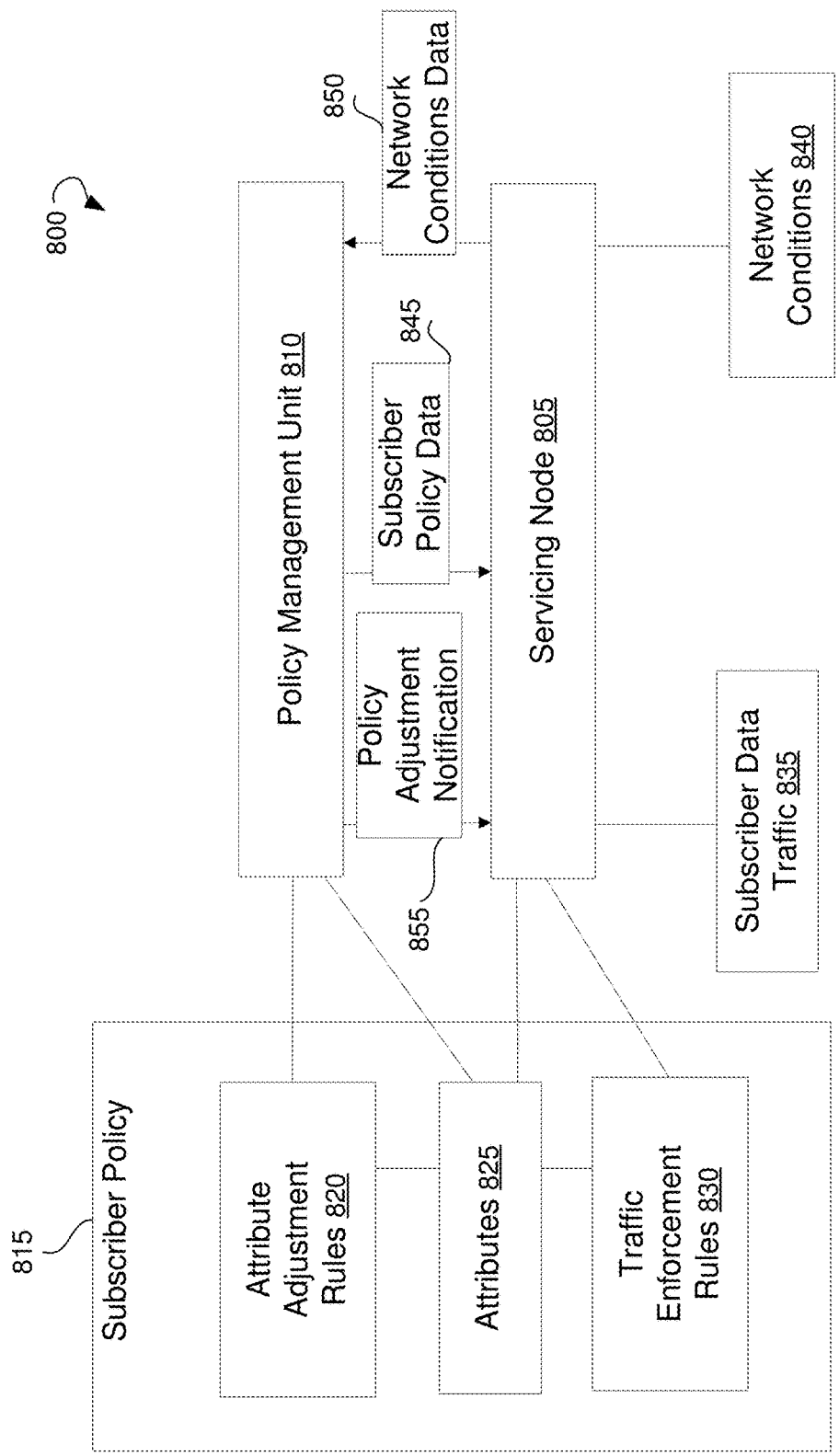
FIG. 8 is a block diagram showing a servicing node and a policy management unit handling automated adjustment of subscriber policies.

FIG. 8 is a is a block diagram 800 showing a servicing node 805 and a policy management unit 810 handling automated adjusting of subscriber policies, according to an example embodiment of the system 700 for automated adjusting of subscriber policies. The policy management unit 810 may be operable to maintain a subscriber policy 815. The subscriber policy 815 may include attribute adjustment rules 820, attributes 825, and traffic enforcement rules 830. The policy management unit 810 may be operable to send subscriber policy data 845 (i.e., data describing the subscriber policy 815) to the servicing node 805. The subscriber policy data 845 may include at least the attributes 825 and the traffic enforcement rules 830.

The servicing node 805 may be operable to apply the traffic enforcement rules 830 to a data traffic 835 associated with a subscriber. The servicing node 805 may be further operable to determine network conditions 840 associated with the data traffic 835. The servicing node 805 may send data 850 associated with the network conditions 840 to the policy management unit 810. In an example embodiment, the network conditions 840 may include one or more of the following: events associated with the network, a network workload, a resource availability, a resource utilization, a subscriber behavior, a user experience, a time, a planned reconfiguration, an unplanned reconfiguration, and so forth.

In an example embodiment, the policy management unit 810 may analyze the network conditions 840. Based on the analysis, the policy management unit 810 may determine an occurrence of a critical event. The critical event may include one or more of the following: an absence of one of predetermined network conditions, presence of an additional network condition being absent from the predetermined network conditions, exceeding a predetermined threshold in the one of the predetermined network conditions, and so forth.

Based on the network conditions 840, such as the occurrence of the critical event, the policy management unit 810 may modify the attributes 825 by applying the attribute adjustment rules 820. Therefore, modified attributes (not shown) may be obtained. The policy management unit 810 may send a policy adjustment notification 855 to the servicing node 805. The policy adjustment notification 855 may contain the modified attributes.

Based on receiving of the policy adjustment notification 855, the servicing node 805 may modify the traffic enforcement rules 830 based on the modified attributes. Therefore, modified traffic enforcement rules (not shown) may be obtained.

Figure 9:
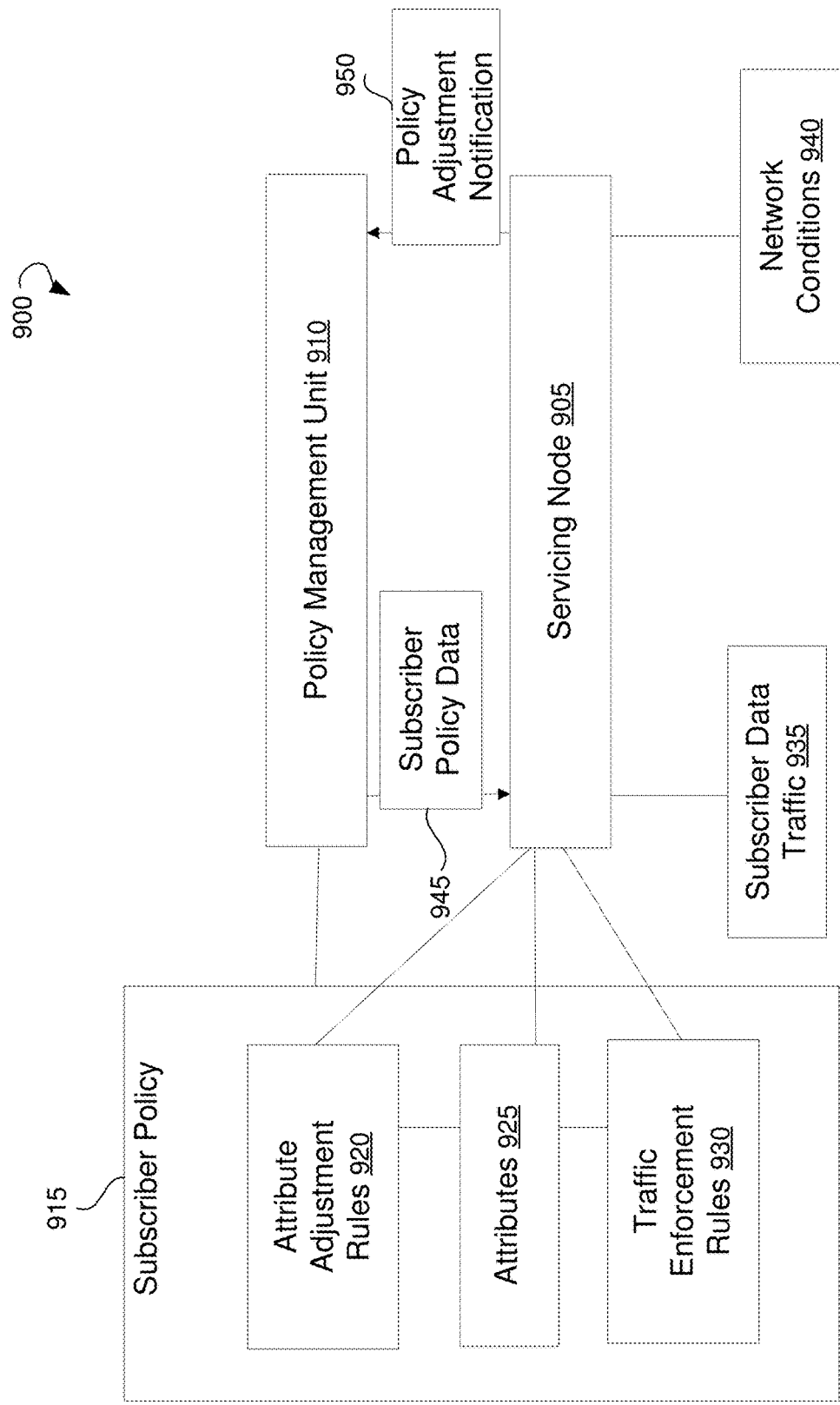
FIG. 9 is a block diagram showing a servicing node and a policy management unit handling automated adjustment of subscriber policies.

FIG. 9 is a is a block diagram 900 showing a servicing node 905 and a policy management unit 910 handling automated adjusting of subscriber policies, according to another example embodiment of the system 700 for automated adjusting of subscriber policies. The policy management unit 910 may be operable to maintain a subscriber policy 915. The subscriber policy 915 may include attribute adjustment rules 920, attributes 925, and traffic enforcement rules 930. The policy management unit 910 may be operable to send subscriber policy data 945 (i.e., data describing the subscriber policy 915) to the servicing node 905. The subscriber policy data 945 may include the attribute adjustment rules 920, the attributes 925, and the traffic enforcement rules 930.

The servicing node 905 may be operable to apply the traffic enforcement rules 930 to a data traffic 935 associated with a subscriber. The servicing node 905 may be further operable to determine network conditions 940 associated with the data traffic 935. In an example embodiment, the network conditions 840 may include one or more of the following: events associated with the network, a network workload, a resource availability, a resource utilization, a subscriber behavior, a user experience, a time, a planned reconfiguration, an unplanned reconfiguration, and so forth.

In an example embodiment, the servicing node 905 may analyze the network conditions 940. Based on the analysis, the servicing node 905 may determine an occurrence of a critical event. The critical event may include one or more of the following: an absence of one of predetermined network conditions, presence of an additional network condition being absent from the predetermined network conditions, exceeding a predetermined threshold in the one of the predetermined network conditions, and so forth.

Based on the network conditions 940, such as the occurrence of the critical event, the servicing node 905 may modify the attributes 925 by applying the attribute adjustment rules 920. Therefore, modified attributes (not shown) may be obtained. Based on the modified attributes, the servicing node 805 may modify the traffic enforcement rules 930. Therefore, modified traffic enforcement rules (not shown) may be obtained.

Additionally, the servicing node 905 may send a policy adjustment notification 950 to the policy management unit 910. The policy adjustment notification 950 may contain the modified traffic enforcement rules.

Thus, the system for automated adjusting of subscriber policies delegates making decisions for policy modification to a servicing node. The servicing node may modify the policies (i.e., the traffic enforcement rules) based on evaluation of monitored events and conditions. Therefore, a network operator does not need to intervene into the network operational process. The servicing node may ensure immediate reaction when policy modification is needed. Therefore, the complexity of policy modification execution can be shifted to the servicing node. The policy management unit may be responsible for defining in advance how to modify the policy if/when modification is needed. Thus, the policy management unit may still be the master of the network operational process and responsible for provisioning rules regarding how the policy can be changed.

Additionally, a policy provisioning transaction (in particular, data traffic associated with sending of the policy or the modified policy) may be smaller by volume, because only some attributes (rather than the whole policy) are modified. Therefore, more transactions per second may be allowed. Furthermore, time needed for massive updates of policies may be reduced. Furthermore, the servicing node may be provided with a template for modifying the policy. The template may include a list of modifiable attributes (i.e., the attributes of the network that can be modified). A list of attributes modified by the servicing node may match the list of modifiable attributes in the template to reduce the probability of operational mistakes during modification of the policy.

Additionally, a partial list of attributes may be provided to the servicing node. The partial list may include only the attributes that have been changed since the previous providing of the policy to the servicing node. Furthermore, there may be no need to provide the template to the servicing node if the template was not changed.

Figure 10:
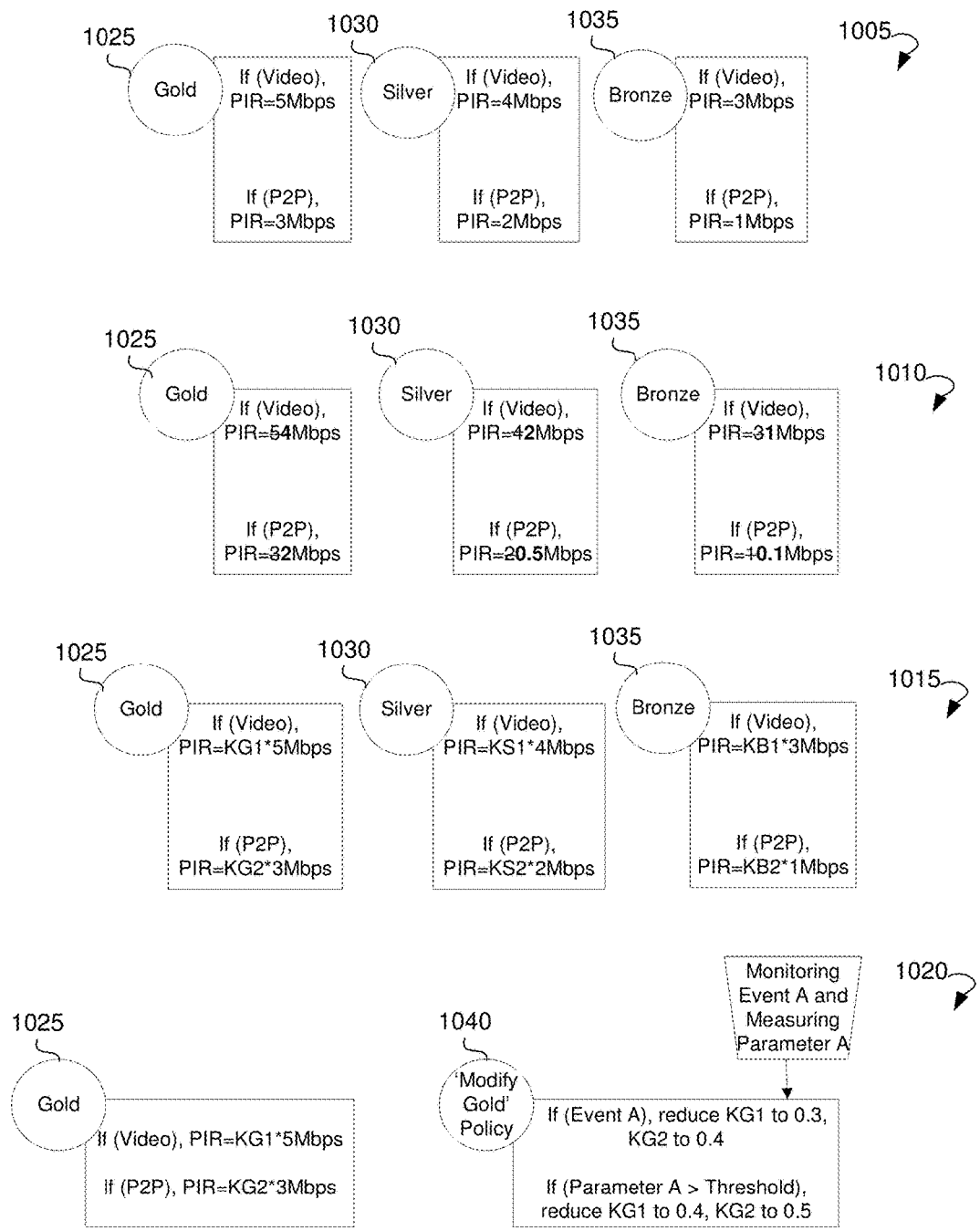
FIG. 10 shows schematic diagrams illustrating examples of policy modifications depending on a level of a service provided to a subscriber.

FIG. 10 shows schematic diagrams 1005, 1010, 1015, and 1020 illustrating examples of modification of policies depending on a level of service provided to a subscriber. The schematic diagrams 1005, 1010, 1015 show three levels 1025, 1030, and 1035 of services, shown as "Gold," "Silver," and "Bronze," respectively.

The schematic diagram 1005 illustrates conventional applying of policies to subscribers. For each of the levels 1025, 1030, and 1035 of services, the policy may be applied based on a type of service. For example, for the level 1025 of services, the policy may prescribe a peak information rate (PIR) of 5 megabits per second if the type of service is a video service, and a PIR of 3 megabits per second if the type of service is a peer-to-peer service. Similarly, for the level 1030 of services, the policy may prescribe a PIR of 4 megabits per second if the type of service is a video service, and a PIR of 2 megabits per second if the type of service is a peer-to-peer service. For the level 1035 of services, the policy may prescribe a PIR of 3 megabits per second if the type of service is a video service, and a PIR of 1 megabits per second if the type of service is a peer-to-peer service. The PIR is a parameter related to a quality of service associated with limiting of the bandwidth.

The schematic diagram 1010 illustrates applying policies, according to the present disclosure. More specifically, according to the policy, if it is determined that the network is congested, services being provided to the subscribers need to be limited for the subscribers of all levels 1025, 1030, and 1035 of services. However, the policy may still keep differentiation between the levels 1025, 1030, and 1035 of services so that the higher level of service (e.g., the level 1025 of services) can obtain better service that the lower level of service (e.g., the level 1030 of service).

Therefore, the services provided to the subscribers may be limited based on the levels 1025, 1030, and 1035 of services. For example, for the level 1025 of services, the policy may prescribe to lower the PIR to 4 megabits per second if the type of service is the video service, and to lower the PIR to 2 megabits per second if the type of service is the peer-to-peer service. Similarly, for the level 1030 of services, the policy may prescribe to lower the PIR to 2 megabits per second if the type of service is the video service, and to lower the PIR to 0.5 megabits per second if the type of service is the peer-to-peer service. For the level 1035 of services, the policy may prescribe to lower the PIR to 1 megabits per second if the type of service is the video service, and to lower the PIR to 0.1 megabits per second if the type of service is the peer-to-peer service. Therefore, though the quality of service will be lowered for the subscribers of all levels 1025, 1030, and 1035 of services in case of congestion of the network, all subscribers can still have access to the service and no subscribers will be disconnected from the service.

The schematic diagram 1015 illustrates applying policies, according to another example embodiment of the present disclosure. More specifically, according to the policy, if it is determined that the network is congested, services being provided to the subscribers need to be limited for the subscribers of all levels 1025, 1030, and 1035 of services. The policy may define a coefficient that may be applied to the provided quality of service. For example, applying of the coefficient equal to 0.8 means limiting providing of the service to 80%. As shown on the schematic diagram 1015, different coefficients, shown as KG, KS, and KB, may be applied to different levels 1025, 1030, and 1035 of services, respectively. Furthermore, different coefficients, shown as KG1 and KG2, KS1 and K52, and KB1 and KB2, may be applied depending on the type of the service. For example, for the level 1025 of services, the PIR of 5 megabits per second may be multiplied by the coefficient KG1 for the video service and by the coefficient KG2 for the peer-to-peer service. After applying the policy, the network conditions can be normalized and the policy may prescribe to stop applying coefficients to the levels 1025, 1030, and 1035 of services.

The schematic diagram 1020 illustrates applying policies, according to another example embodiment of the present disclosure. As shown on the schematic diagram 1020, for the level 1025 of services, coefficients KG1 and KG2 may be applied to the video service and the peer-to-peer service, respectively. The network parameters associated with the subscriber of the level 1025 of services may be monitored. A policy 1040 for modifying the level 1025 of services, for example, in case of detection of a certain event, may prescribe to reduce the coefficient KG1 to 0.3 and the coefficient KG2 to 0.4. Additionally, if a certain parameter of the network exceeds a predetermined threshold, the policy may prescribe to reduce the coefficient KG1 to 0.4 and the coefficient KG2 to 0.5.

In an example embodiment, a servicing node may select coefficients for different levels of services and different types of services based on attribute adjustment rules. The attribute adjustment rules may contain rules defining how the attributes of the network, such as the PIR, need to be modified.

In example embodiments, the modification of policies may be performed by the servicing node not only in cases when the network is congested. More specifically, the servicing node may determine that a network load is low and may modify the policies, for example, by increasing the PIR, to allow the subscribers to go beyond the bandwidth of initially applied policies. Additionally, such modification of policies may allow for utilizing network resources efficiently and not letting the system idle.

Figure 11:
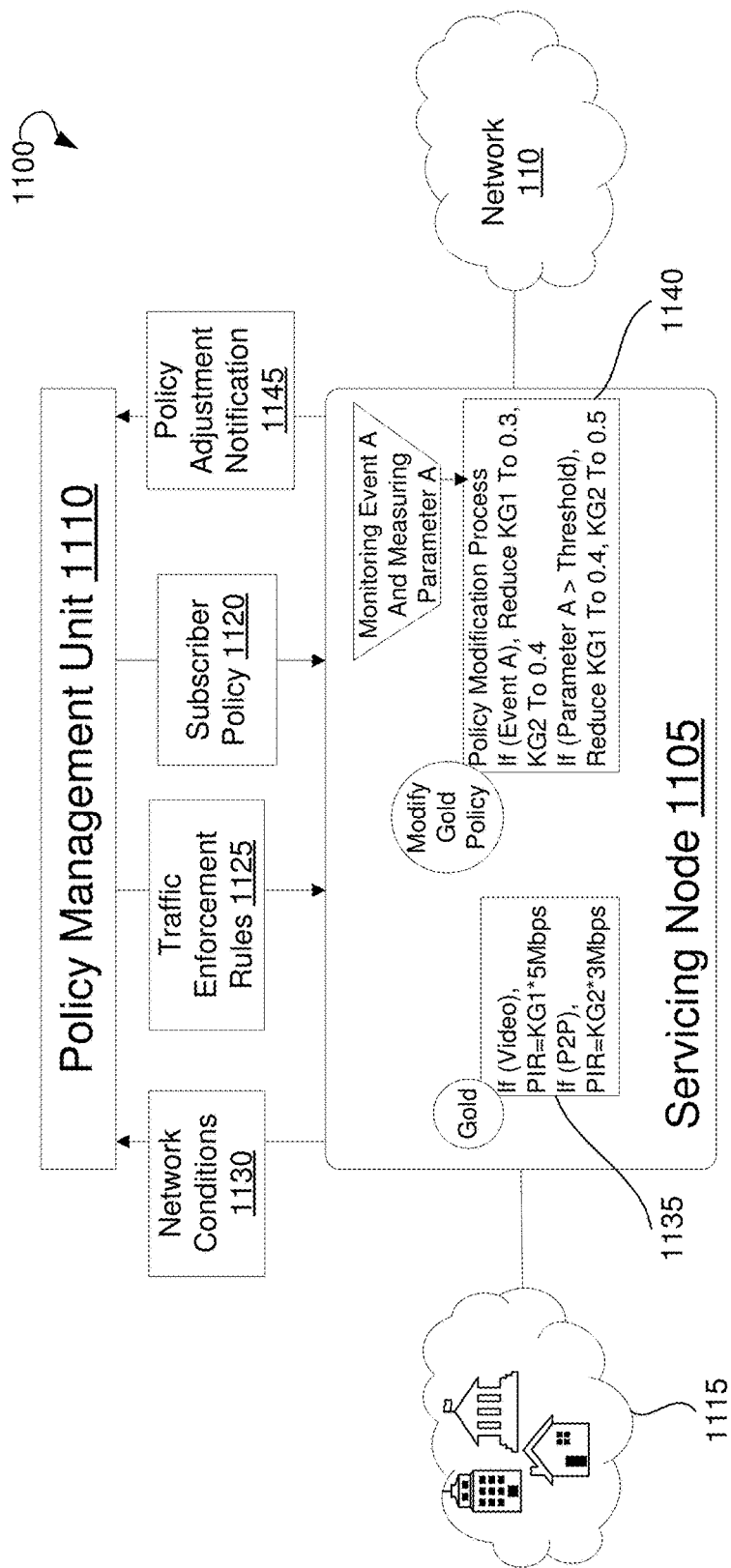
FIG. 11 is a schematic diagram showing adjustment of subscriber policies.

FIG. 11 is a schematic diagram 1100 showing adjusting of subscriber policies. A servicing node 1105 may communicate with network 110 and a subscriber 1115. A policy management unit 1110 may provide the servicing node 1105 with a subscriber policy 1120. The subscriber policy 1120 may include traffic enforcement rules 1125 defining rules for processing the data traffic upon identification of certain network conditions. The servicing node 1105 may monitor network conditions and events and measure parameters of the network 110. In some embodiments, the servicing node 1105 may send data related to the network conditions 1130 to the policy management unit 1110. The servicing node 1105 may modify the traffic enforcement rules 1125 and send a policy adjustment notification 1145 to the policy management unit 1110. The servicing node 1105 may apply different policies 1140 to different levels of services, such as level 1135 of services.

Figure 12:
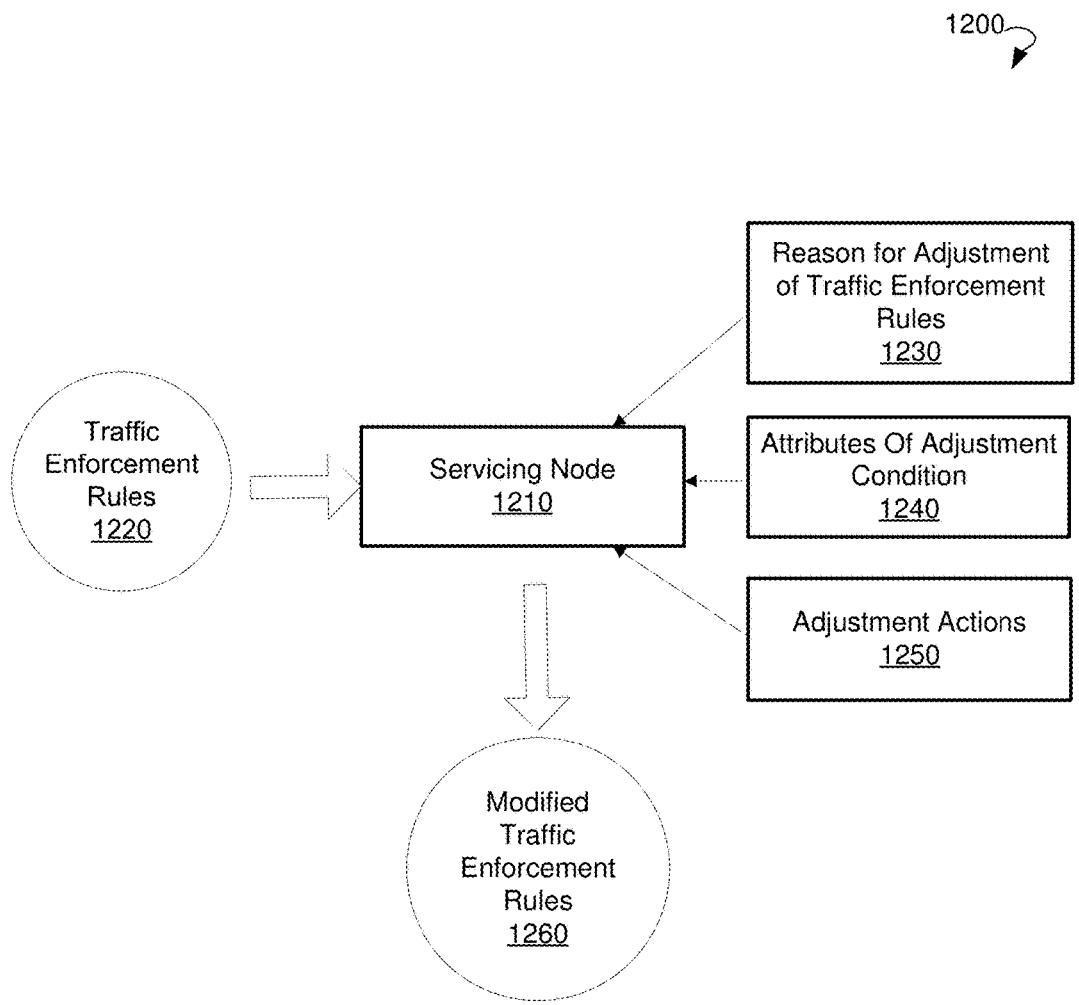
FIG. 12 is a block diagram illustrating modifications of traffic enforcement rules by a servicing node.

FIG. 12 is a block diagram 1200 illustrating modification of traffic enforcement rules by a servicing node. The servicing node 1210 may be provided with traffic enforcement rules 1220. Upon monitoring of network conditions, the servicing node 1210 may determine that there is a reason 1230 for adjustment of the traffic enforcement rules 1220. Furthermore, based on the network conditions, the servicing node 1210 may determine attributes 1240 of adjustment conditions (i.e., attributes that need modifying). Based on attribute adjustment rules shown as adjustment actions 1250 (which may be received in advance by the servicing node 1210 from a policy management unit), the servicing node 1210 may modify the attributes 1240 of adjustment conditions. The servicing node 1210 may modify the traffic enforcement rules 1220 by including data related to modified attributes into the traffic enforcement rules 1220. Therefore, modified traffic enforcement rules 1260 may be provided.

EXAMPLES OF MODIFICATION OF TRAFFIC ENFORCEMENT RULES BY A SERVICING NODE

Example 1

A traffic enforcement rule 1220 may be related to limiting bandwidth consumed by the application. Rules for this traffic enforcement rule 1220 may be as follows: "Rule 1: If <Netflix Video>, QoS-PIR=K1*2 Mbps," "Rule 2: if <Amazon Video>, QoS-PIR=K2*3 Mbps," where K is a coefficient that may be applied to the quality of service and QoS means the quality of service. The reason 1230 for adjustment of the traffic enforcement rule 1220 may be that a predefined bandwidth limit is not enough to ensure access to an application to active subscribers. The attributes 1240 of adjustment conditions may include an aggregated bandwidth consumed by the active subscribers trying to access the application. The adjustment actions 1250 may include reducing bandwidth limit proportionally to a level of service provided to the subscriber. The adjustment actions 1250 may be defined as "If <aggregated bandwidth of subscribers exceeds 30 Gbps, K1=K1*0.5, K2=K2*0.7".

Alternatively, the reason 1230 for adjustment of the traffic enforcement rule 1220 may be that a demand became lower and, therefore, more bandwidth is available for active subscribers and more application servers become available. The attributes 1240 of adjustment conditions may include a number of active subscribers trying to consume application bandwidth and a number of application servers. The adjustment actions 1250 may include increasing bandwidth limit to an originally predefined level.

Example 2

A traffic enforcement rule 1220 may be related to optimizing video traffic. Rules for this traffic enforcement rule 1220 may be as follows: "Rule 1: If <HD Video>, forward to VAS cluster optimizers including endpoint-1, endpoint-2, endpoint-3," where VAS cluster is a value adding service cluster. The reason 1230 for adjustment of the traffic enforcement rule 1220 may be that a number of subscribers entitled for video optimization has grown and the cluster of optimizers may need to be extended. The attributes 1240 of adjustment conditions may include a number of premium subscribers that require video optimization. The adjustment actions 1250 may include adding endpoint-4 and endpoint-5 to a pool of optimizers of the value adding service cluster. The adjustment actions 1250 may be defined as "Modify the optimizer pool by adding more endpoints."

Example 3

A traffic enforcement rule 1220 may be related to handling Domain Name System (DNS) traffic. Rules for this traffic enforcement rule 1220 may be as follows: "Rule 1: If <DNS protocol>, steer traffic to the pool of DNS servers." The reason 1230 for adjustment of the traffic enforcement rule 1220 may be that a volume of DNS traffic is higher than a predetermined threshold. The attributes 1240 of adjustment conditions may include DNS traffic aggregated bandwidth. The adjustment actions 1250 may include increasing the DNS server pool. The adjustment actions 1250 may be defined as "Add additional servers to the DNS cluster."

Alternatively, the reason 1230 for adjustment of the traffic enforcement rule 1220 may be that a volume of DNS traffic returned to normal. The attributes 1240 of adjustment conditions may include returning of volume of DNS to normal. The adjustment actions 1250 may include decreasing the DNS server pool. The adjustment actions 1250 may be defined as "Reduce the number of DNS servers."

Example 4

A traffic enforcement rule 1220 may be related to subscriber monitoring. Rules for this traffic enforcement rule 1220 may be as follows: "Rule 1: For <HTTP protocol>, generate flow-based report"; "Rule 2: if <other traffic>, generate periodical aggregated reporting records." The reason 1230 for adjustment of the traffic enforcement rule 1220 may be that the behavior of the subscriber becomes suspicious and the network operator needs a more granular report for browsing habits. The attributes 1240 of adjustment conditions may include behavioral analysis. The adjustment actions 1250 may include adjusting policy for the subscriber switching from a flow-based report to a transaction-based report. The adjustment actions 1250 may be defined as "Change granularity and frequency of generated reporting records."

Alternatively, the reason 1230 for adjustment of the traffic enforcement rule 1220 may be that behavior of the subscriber returned to normal, and there is no need for high scrutiny reporting. The attributes 1240 of adjustment conditions may include behavioral analysis. The adjustment actions 1250 may include returning subscriber to a flow-based reporting mode. The adjustment actions 1250 may be defined as "Change granularity and frequency of generated reporting records."

Figure 13:
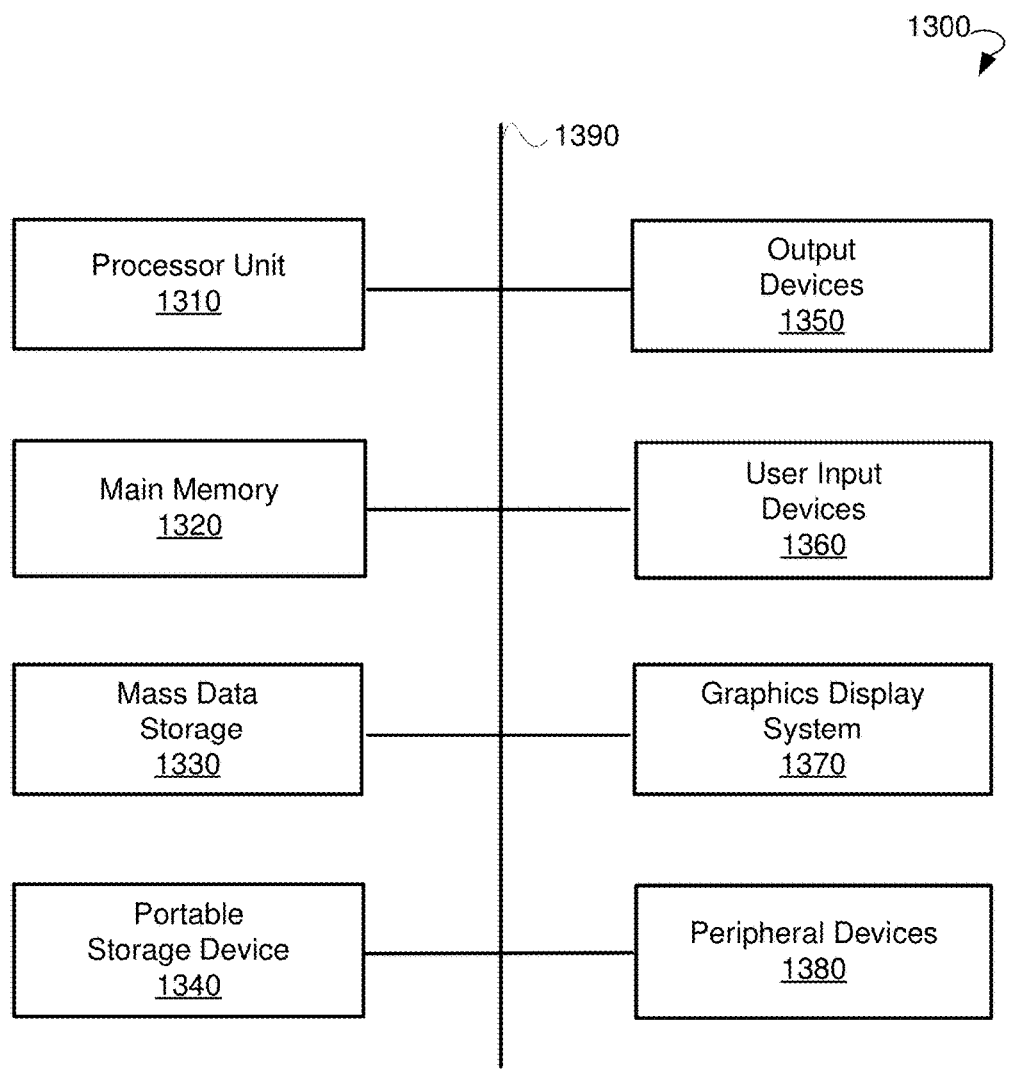
FIG. 13 shows a diagrammatic representation of a computing device for a machine, within which a set of instructions for causing the machine to perform any one or more of the methodologies discussed herein, can be executed.

FIG. 13 illustrates an example computer system 1300 that may be used to implement embodiments of the present disclosure. The system 1300 of FIG. 13 can be implemented in the contexts of the likes of computing systems, networks, servers, or combinations thereof. The computing system 1300 of FIG. 13 includes one or more processor units 1310 and main memory 1320. Main memory 1320 stores, in part, instructions and data for execution by processor 1310. Main memory 1320 stores the executable code when in operation. The computer system 1300 of FIG. 13 further includes a mass data storage 1330, portable storage device 1340, output devices 1350, user input devices 1360, a graphics display system 1370, and peripheral devices 1380. The methods may be implemented in software that is cloud-based.

The components shown in FIG. 13 are depicted as being connected via a single bus 1390. The components may be connected through one or more data transport means. Processor unit 1310 and main memory 1320 are connected via a local microprocessor bus, and the mass data storage 1330, peripheral device(s) 1380, portable storage device 1340, and graphics display system 1370 are connected via one or more input/output (I/O) buses.

Mass data storage 1330, which can be implemented with a magnetic disk drive, solid state drive, or an optical disk drive, is a non-volatile storage device for storing data and instructions for use by processor unit 1310. Mass data storage 1330 stores the system software for implementing embodiments of the present disclosure for purposes of loading that software into main memory 1320.

Portable storage device 1340 operates in conjunction with a portable non-volatile storage medium, such as a floppy disk, compact disk (CD), digital video disc (DVD), or USB storage device, to input and output data and code to and from the computer system 1300 of FIG. 13. The system software for implementing embodiments of the present disclosure is stored on such a portable medium and input to the computer system 1300 via the portable storage device 1340.

User input devices 1360 provide a portion of a user interface. User input devices 1360 include one or more microphones, an alphanumeric keypad, such as a keyboard, for inputting alphanumeric and other information, or a pointing device, such as a mouse, a trackball, stylus, or cursor direction keys. User input devices 1360 can also include a touchscreen. Additionally, the computer system 1300 as shown in FIG. 13 includes output devices 1350. Suitable output devices include speakers, printers, network interfaces, and monitors.

Graphics display system 1370 includes a liquid crystal display (LCD) or other suitable display device. Graphics display system 1370 receives textual and graphical information and processes the information for output to the display device.

Peripheral devices 1380 may include any type of computer support device to add additional functionality to the computer system.

The components provided in the computer system 1300 of FIG. 13 are those typically found in computer systems that may be suitable for use with embodiments of the present disclosure and are intended to represent a broad category of such computer components that are well known in the art. Thus, the computer system 1300 of FIG. 13 can be a personal computer (PC), hand held computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, DVD, BLU-RAY DISC (BD), any other optical storage medium, Random-Access Memory (RAM), Programmable Read-Only Memory (PROM), Erasable Programmable Read-Only Memory (EPROM), Electronically Erasable Programmable Read Only Memory (EEPROM), flash memory, and/or any other memory chip, module, or cartridge.

In some embodiments, the computer system 1300 may be implemented as a cloud-based computing environment, such as a virtual machine operating within a computing cloud. In other embodiments, the computer system 1300 may itself include a cloud-based computing environment, where the functionalities of the computer system 1300 are executed in a distributed fashion. Thus, the computer system 1300, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 1300, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for automated adjusting of subscriber policies are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A system for automated adjusting of subscriber policies, the system comprising:
   a servicing node operable to:
      apply traffic enforcement rules to a data traffic associated with one or more subscribers, the data traffic being served by a plurality of network nodes, each of the one or more subscribers being assigned a level of service for providing the data traffic, the level of service guaranteeing a proportional difference between an amount of the data traffic provided to the each of the one or more subscribers based on the level of service;

determine network conditions associated with the data traffic, the network conditions being indicative of increases or decreases in a demand for bandwidth for data moving across a network associated with the one or more subscribers, the increases or the decreases in the demand being determined based on at least one of an amount of bandwidth consumed by the one or more subscribers, a resource availability associated with the network, and a planned reconfiguration of the network;

based on the determination, change a number of the plurality of network nodes serving the data traffic, the number of the plurality network nodes being selected based on the modified amount of the data traffic; and modify the traffic enforcement rules based on modified amount of the data traffic to be provided to the each of the one or more subscribers and based on the selected number of the plurality network nodes to obtain modified traffic enforcement rules; and a policy management unit being a hardware-based policy management unit operable to:
based on the determination of the network conditions, modify the amount of the data traffic to be provided to the each of the one or more subscribers, wherein the amount of the data traffic is proportionally modified according to the level of service associated with the each of the one or more subscribers.

2. The system of claim 1, wherein the policy management unit is further operable to send a subscriber policy to the servicing node, the subscriber policy including attributes and attribute adjustment rules.

3. The system of claim 1, wherein the policy management unit is further operable to send the modified amount of the data traffic provided to the each of the one or more subscribers to the servicing node.

4. The system of claim 1, wherein the servicing node is further operable to send data associated with the network conditions to the policy management unit.

5. The system of claim 1, wherein the servicing node is further operable to monitor the network conditions within the network.

6. The system of claim 1, wherein the policy management unit is further operable to:
analyze the network conditions; and
based on the analysis, determine an occurrence of a critical event; and
in response to the determination, modify the amount of the data traffic provided to the each of the one or more subscribers.

7. The system of claim 6, wherein the critical event includes one or more of the following: an absence of one of predetermined network conditions, presence of an additional network condition absent from the predetermined network conditions, and exceeding a predetermined threshold by the one of the predetermined network conditions.

8. The system of claim 1, wherein the network conditions include one or more of the following: events associated with the network, a network workload, a resource utilization, a subscriber behavior, a user experience, a time, and an unplanned reconfiguration.

9. A system for automated adjustment of subscriber policies, the system comprising:

a servicing node comprising a hardware processor and a memory, the hardware processor being operable to:
apply traffic enforcement rules to a data traffic associated with one or more subscribers, the data traffic being served by a plurality of network nodes, each of the one or more subscribers being assigned a level of service for providing the data traffic, the level of service guaranteeing a proportional difference between an amount of the data traffic provided to the each of the one or more subscribers based on the level of service;

determine network conditions associated with the data traffic, the network conditions being indicative of increases or decreases in a demand for bandwidth for data moving across a network associated with the one or more subscribers, the increases or the decreases in the demand being determined based on at least one of an amount of bandwidth consumed by the one or more subscribers, a resource availability associated with the network, and a planned reconfiguration of the network;

based on the determination, modify the amount of the data traffic to be provided to the each of the one or more subscribers, wherein the amount of the data traffic is proportionally modified according to the level of service associated with the each of the one or more subscribers;

based on the determination, change a number of the plurality of network nodes serving the data traffic, the number of the plurality network nodes being selected based on the modified amount of the data traffic; and modify the traffic enforcement rules based on the modified amount of the data traffic to be provided to the each of the one or more subscribers and based on the selected number of the plurality network nodes to obtain modified traffic enforcement rules.

10. The system of claim 9, further comprising a policy management unit operable to send a subscriber policy to the servicing node, the subscriber policy including attributes, attribute adjustment rules, and the traffic enforcement rules.

11. The system of claim 10, wherein the servicing node is further operable to send a policy adjustment notification to the policy management unit, the policy adjustment notification being associated with the modified traffic enforcement rules.

12. The system of claim 9, wherein the servicing node is further operable to:
analyze the network conditions;
based on the analysis, determine an occurrence of a critical event; and
in response to the occurrence, modify the amount of the data traffic provided to the each of the one or more subscribers.

13. The system of claim 12, wherein the critical event includes one or more of the following: an absence of one of predetermined network conditions, presence of an additional network condition absent from the predetermined network conditions, and exceeding a predetermined threshold by the one of the predetermined network conditions.

14. A method for automated adjustment of subscriber policies, the method comprising:
applying, by a servicing node, traffic enforcement rules to a data traffic associated with one or more subscribers, the data traffic being served by a plurality of network nodes, each of the one or more subscribers being assigned a level of service for providing the data traffic, the level of service guaranteeing a proportional difference between an amount of the data traffic provided to the each of the one or more subscribers based on the level of service;

determining, by the servicing node, network conditions associated with the data traffic, the network conditions being indicative of increases or decreases in a demand for bandwidth for data moving across a network associated with the one or more subscribers, the increases or the decreases in the demand being determined based on at least one of an amount of bandwidth consumed by the one or more subscribers, a resource availability associated with the network, and a planned reconfiguration of the network;

based on the determination, modifying, by a policy management unit, the amount of the data traffic to be provided to the each of the one or more subscribers, wherein the amount of the data traffic is proportionally modified according to the level of service associated with the each of the one or more subscribers;

based on the determination, changing, by the servicing node, a number of the plurality of network nodes serving the data traffic, the number of the plurality network nodes being selected based on the modified amount of the data traffic; and modifying, by the servicing node, the traffic enforcement rules based on the modified amount of the data traffic to be provided to the each of the one or more subscribers and based on the selected number of the plurality network nodes to obtain modified traffic enforcement rules.

15. The method of claim 14, further comprising receiving a subscriber policy, the subscriber policy including one or more of the following: attributes, attribute adjustment rules, and the traffic enforcement rules.

16. The method of claim 14, wherein the network conditions include one or more of the following: events associated with the network, a network workload, a resource utilization, a subscriber behavior, a user experience, a time, and an unplanned reconfiguration.

17. The method of claim 14, further comprising monitoring the network conditions within the network.

18. The method of claim 14, further comprising:
analyzing the network conditions;
based on the analyzing, determining an occurrence of a critical event; and
in response to the occurrence, modifying the amount of the data traffic provided to the each of the one or more subscribers.

19. The method of claim 18, wherein the critical event includes one or more of the following: an absence of one of predetermined network conditions, presence of an additional network condition absent from the predetermined network conditions, and exceeding a predetermined threshold by the one of the predetermined network conditions.

20. The method of claim 14, further comprising applying the modified traffic enforcement rules to a further data traffic associated with the one or more sub scribers.

* * * * *